(12) United States Patent
Masui et al.

(10) Patent No.: US 11,378,880 B2
(45) Date of Patent: Jul. 5, 2022

(54) PROJECTION OPTICAL SYSTEM AND PROJECTION APPARATUS THAT ENLARGE AND PROJECT AN IMAGE DISPLAYED ON A DISPLAY

(71) Applicant: Konica Minolta, Inc., Tokyo (JP)

(72) Inventors: Atsuo Masui, Sakai (JP); Kazuhiko Inoue, Sakai (JP); Atsushi Matsuura, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/070,133

(22) Filed: Oct. 14, 2020

(65) Prior Publication Data

US 2021/0026229 A1 Jan. 28, 2021

Related U.S. Application Data

(63) Continuation of application No. 16/395,370, filed on Apr. 26, 2019, now Pat. No. 10,845,695, which is a (Continued)

(30) Foreign Application Priority Data

Apr. 20, 2017 (JP) .............................. JP2017-083758

(51) Int. Cl.
*G03B 21/28* (2006.01)
*G02B 13/16* (2006.01)
(Continued)

(52) U.S. Cl.
CPC ............. *G03B 21/28* (2013.01); *G02B 13/04* (2013.01); *G02B 13/16* (2013.01); *G02B 13/22* (2013.01);
(Continued)

(58) Field of Classification Search
CPC ........ G03B 21/28; G03B 21/14; G02B 13/04; G02B 13/16; G02B 13/22; G02B 17/008; G02B 17/0896
See application file for complete search history.

(56) References Cited

U.S. PATENT DOCUMENTS 6,450,648 B1 9/2002 Ohzawa et al.
7,009,765 B2 3/2006 Gohman
(Continued)

FOREIGN PATENT DOCUMENTS

CN 205539665 U 8/2016
CN 205539675 U 8/2016
(Continued)

OTHER PUBLICATIONS

Office Action issued in corresponding Japanese Patent Application No. 2017-083758 dated Feb. 1, 2021 (6 pages).
(Continued)

*Primary Examiner* — Bao-Luan Q Le
(74) *Attorney, Agent, or Firm* — Osha Bergman Watanabe & Burton LLP

(57) ABSTRACT

A projection optical system that enlarges and projects an image displayed on an image display includes: a first optical system; and a second optical system. The projection optical system is a monofocal lens or a zoom lens. The first optical system and the second optical system are arranged, in order starting with the first optical system, from an enlargement side of the projection optical system. The second optical system forms an intermediate image of the image between the first optical system and the second optical system. The first optical system enlarges and projects the intermediate image. The first optical system includes: a first-A optical system and a first-B optical system in order from the enlargement side; and a reflecting optical element that bends
(Continued)

a light path between the first-A optical system and the first-B optical system.

13 Claims, 16 Drawing Sheets

Related U.S. Application Data continuation of application No. 15/954,156, filed on Apr. 16, 2018, now Pat. No. 10,317,786.

(51) Int. Cl.
*G03B 21/14* (2006.01)
*G02B 13/22* (2006.01)
*G02B 13/04* (2006.01)
*G02B 17/00* (2006.01)
*G02B 17/08* (2006.01)

(52) U.S. Cl.
CPC ....... *G02B 17/008* (2013.01); *G02B 17/0896* (2013.01); *G03B 21/14* (2013.01)

(56) References Cited

U.S. PATENT DOCUMENTS

| | | |
|---|---|---|
| 7,224,535 B2 | 5/2007 | Neil |
| 7,413,312 B2 | 8/2008 | Engle et al. |
| 9,041,848 B2 | 5/2015 | Inoko |
| 9,523,907 B2 | 12/2016 | Ode |
| 9,869,849 B2 | 1/2018 | Amano |
| 10,338,356 B2 | 7/2019 | Amano |
| 10,386,618 B2 | 8/2019 | Amano |
| 10,401,596 B2 | 9/2019 | Masui |
| 10,401,597 B2 | 9/2019 | Amano |
| 10,527,828 B2 * | 1/2020 | Amano ................ G02B 15/145 |
| 2004/0032653 A1 * | 2/2004 | Gohman ................ G02B 13/16 359/434 |
| 2004/0223123 A1 | 11/2004 | Engle et al. |
| 2004/0233394 A1 | 11/2004 | Gohman |
| 2004/0257539 A1 | 12/2004 | Peterson et al. |
| 2006/0290897 A1 | 12/2006 | Engle et al. |
| 2007/0253076 A1 | 11/2007 | Takaura et al. |
| 2008/0130106 A1 | 6/2008 | Gohman |
| 2009/0207502 A1 | 8/2009 | Cho |
| 2009/0244701 A1 | 10/2009 | Gohman |
| 2012/0120484 A1 | 5/2012 | Konuma et al. |
| 2013/0010370 A1 | 1/2013 | Otani et al. |
| 2013/0010371 A1 | 1/2013 | Otani et al. |
| 2013/0229635 A1 | 9/2013 | Lin et al. |
| 2014/0036142 A1 | 2/2014 | Inoko |
| 2014/0347740 A1 | 11/2014 | Nagatoshi |
| 2015/0234167 A1 * | 8/2015 | Ode ..................... G03B 21/142 359/432 |
| 2015/0268453 A1 | 9/2015 | Oe et al. |
| 2016/0154224 A1 * | 6/2016 | Imai .................... G02B 15/177 359/680 |
| 2016/0246034 A1 * | 8/2016 | Amano .............. G02B 13/0095 |
| 2016/0246035 A1 | 8/2016 | Amano |
| 2016/0246036 A1 | 8/2016 | Amano |
| 2016/0246037 A1 * | 8/2016 | Amano .................. G02B 13/22 |
| 2016/0246038 A1 | 8/2016 | Amano |
| 2017/0153427 A1 | 6/2017 | Masui |
| 2017/0343776 A1 * | 11/2017 | Nagatoshi .............. G02B 13/16 |
| 2017/0343777 A1 | 11/2017 | Nagatoshi |
| 2017/0343778 A1 * | 11/2017 | Amano .................. G02B 13/16 |
| 2017/0343782 A1 * | 11/2017 | Amano .............. G02B 17/0896 |
| 2017/0351070 A1 * | 12/2017 | Shiokawa .......... G02B 27/0025 |
| 2018/0059385 A1 * | 3/2018 | Amano ................ G02B 15/144 |
| 2018/0059386 A1 | 3/2018 | Nagatoshi |
| 2018/0059388 A1 * | 3/2018 | Amano ................ G02B 15/142 |
| 2018/0059389 A1 * | 3/2018 | Inoue ..................... G02B 15/20 |
| 2018/0059519 A1 * | 3/2018 | Nagatoshi ............ G02B 13/009 |

FOREIGN PATENT DOCUMENTS

| | | |
|---|---|---|
| JP | H06-138386 A | 5/1994 |
| JP | 2006-523318 A | 10/2006 |
| JP | 2008-536175 A | 9/2008 |
| JP | 2016-156982 A | 9/2016 |

OTHER PUBLICATIONS

Office Action issued in corresponding Chinese Patent Application No. 201810335281.4 dated Mar. 20, 2020, with translation (11 pages).

Office Action issued in counterpart Chinese Patent Application No. CN 202110032969.7 dated Jan. 26, 2022 (13 pages).

Notification of Reasons for Refusal issued in corresponding Japanese Patent Application No. 2017-083758 dated Oct. 5, 2021 (8 pages).

* cited by examiner

EX4

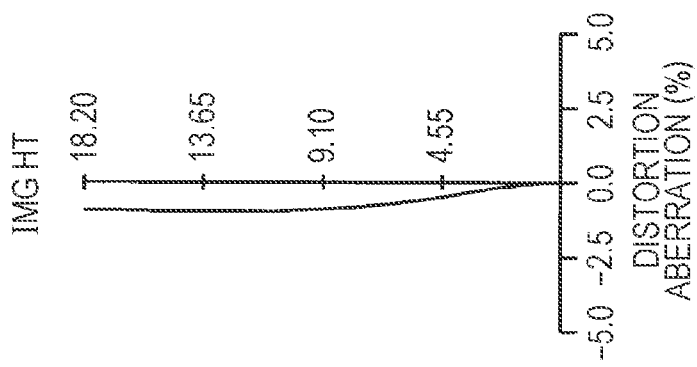
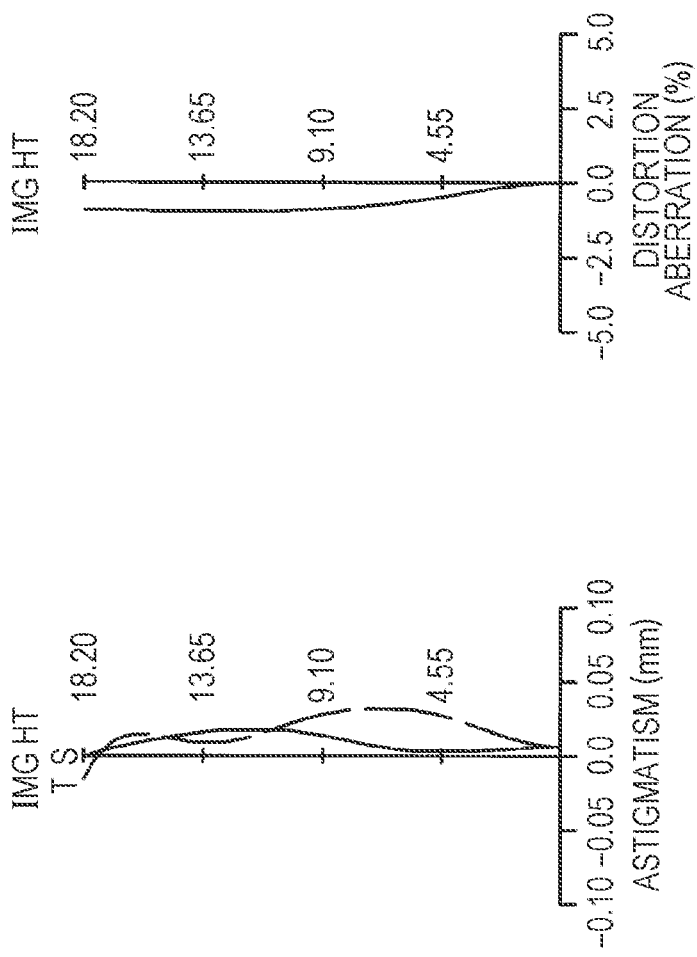
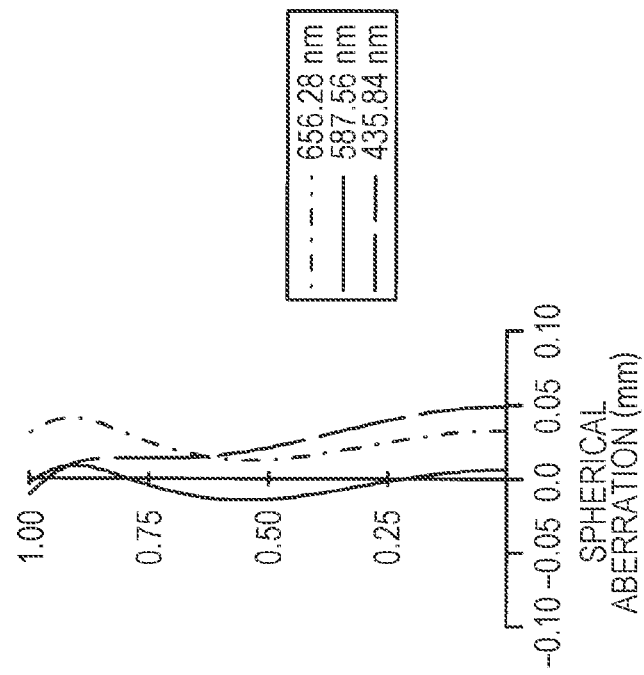

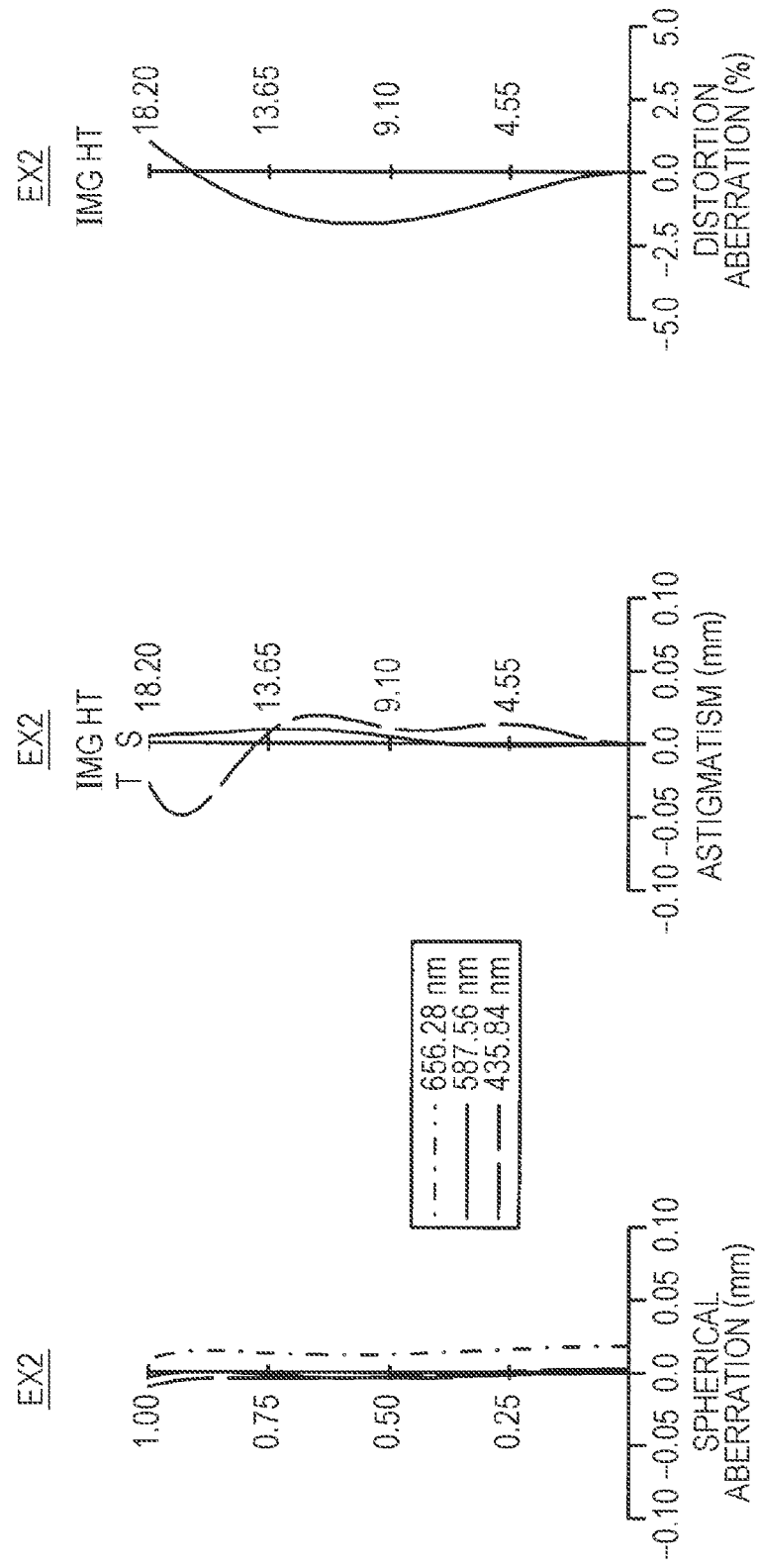

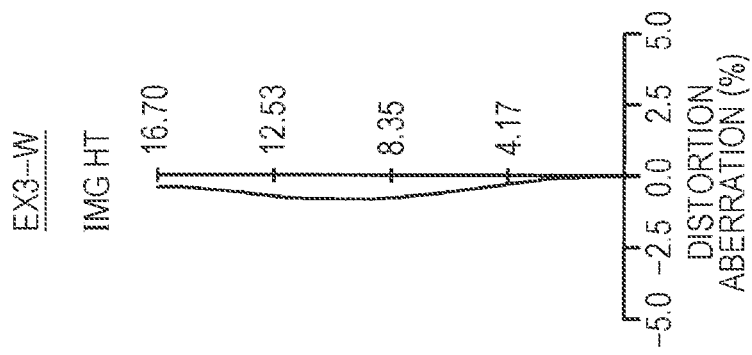
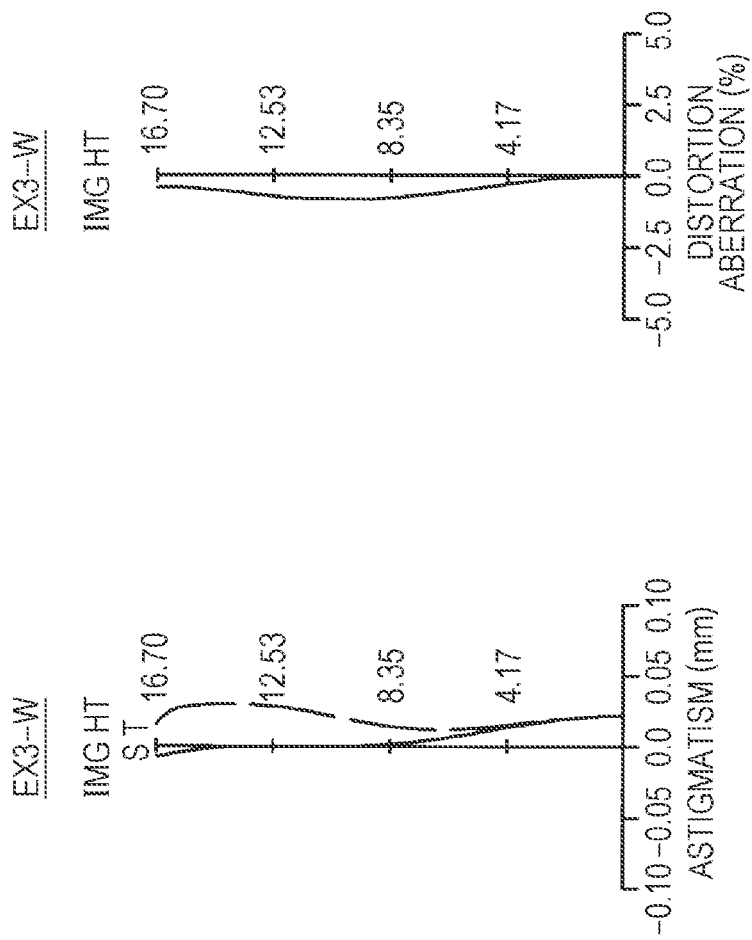
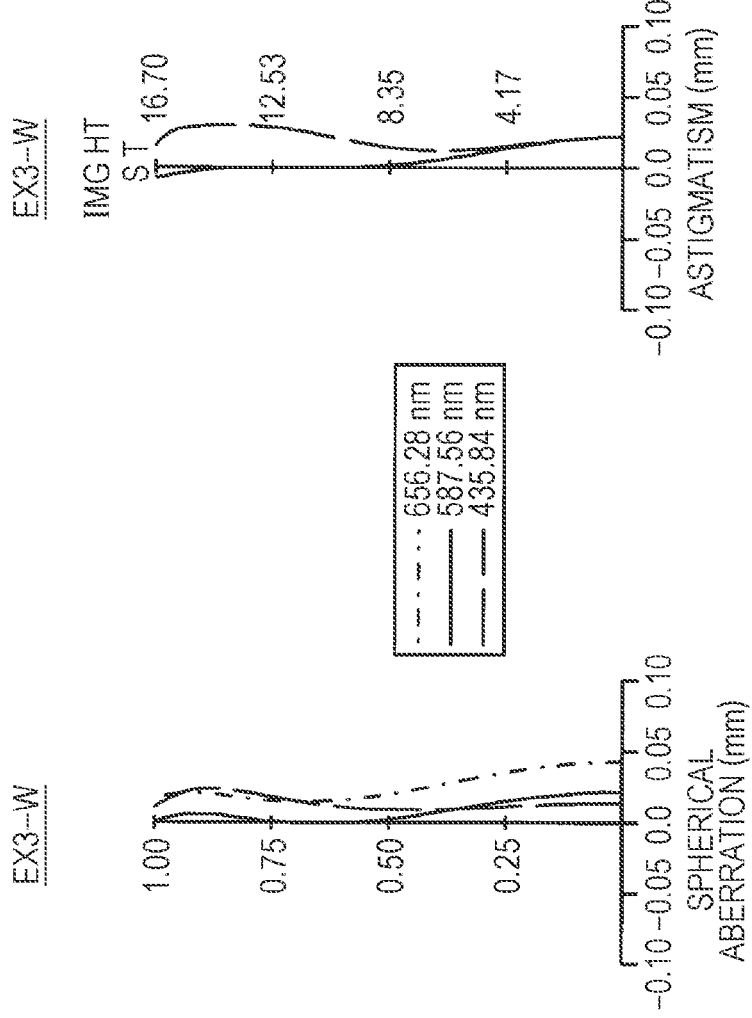

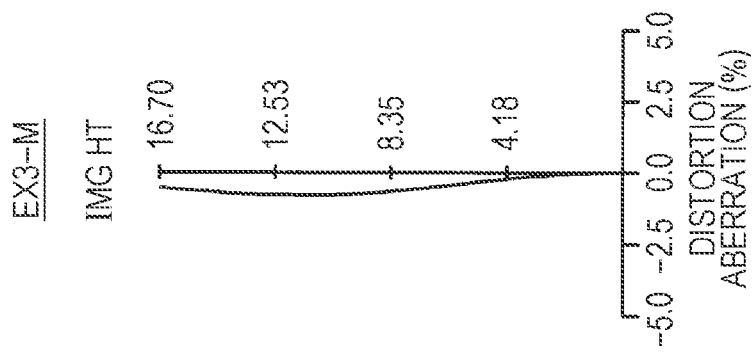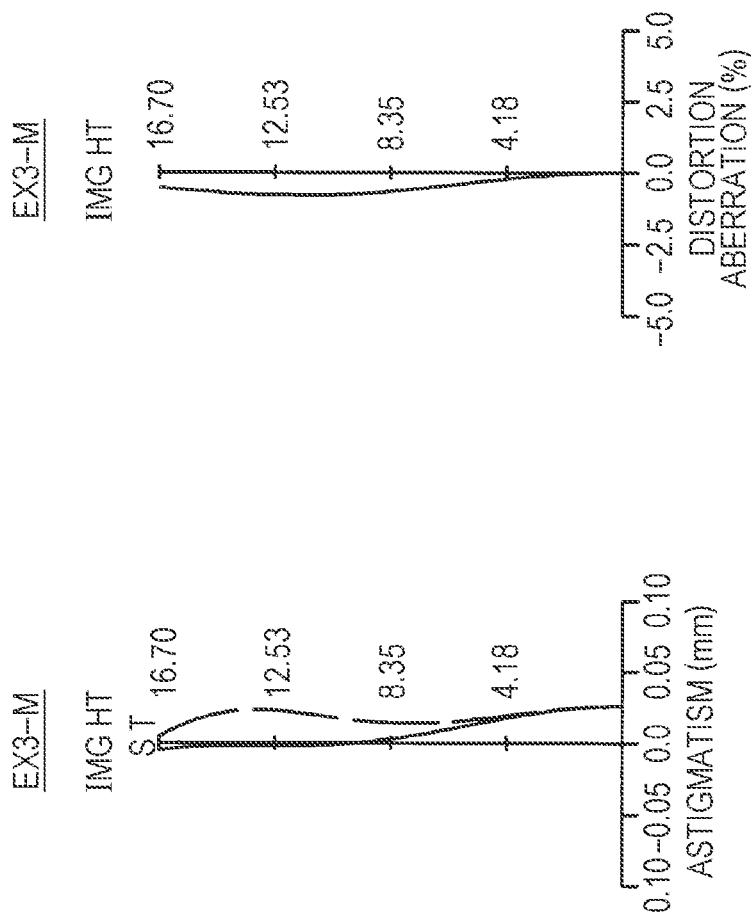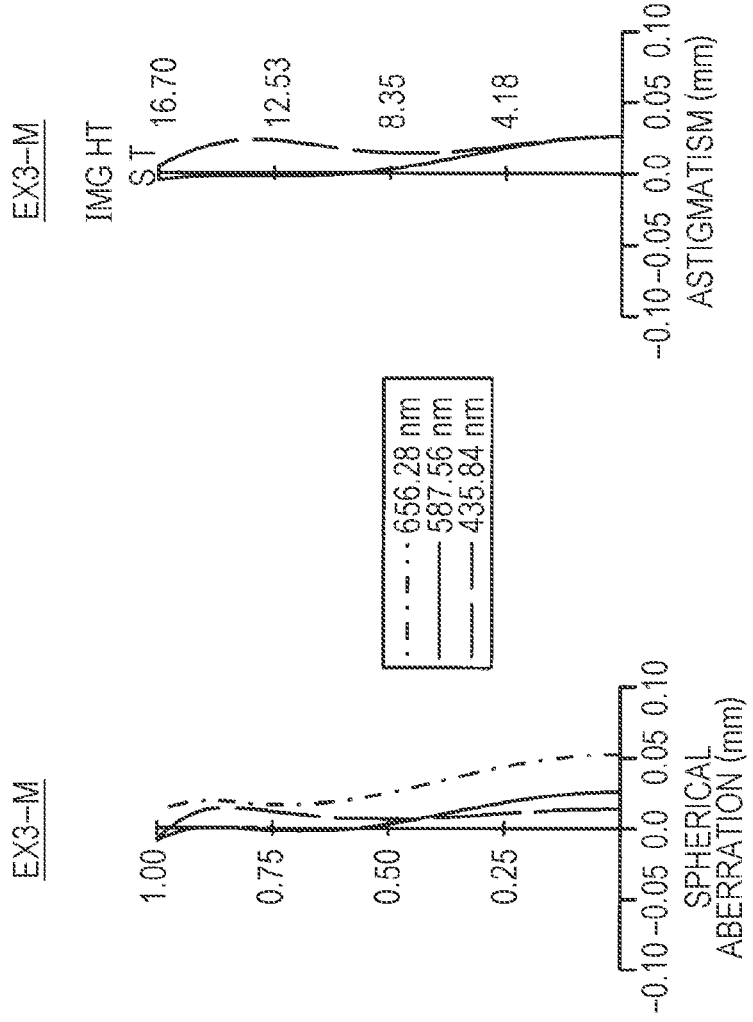

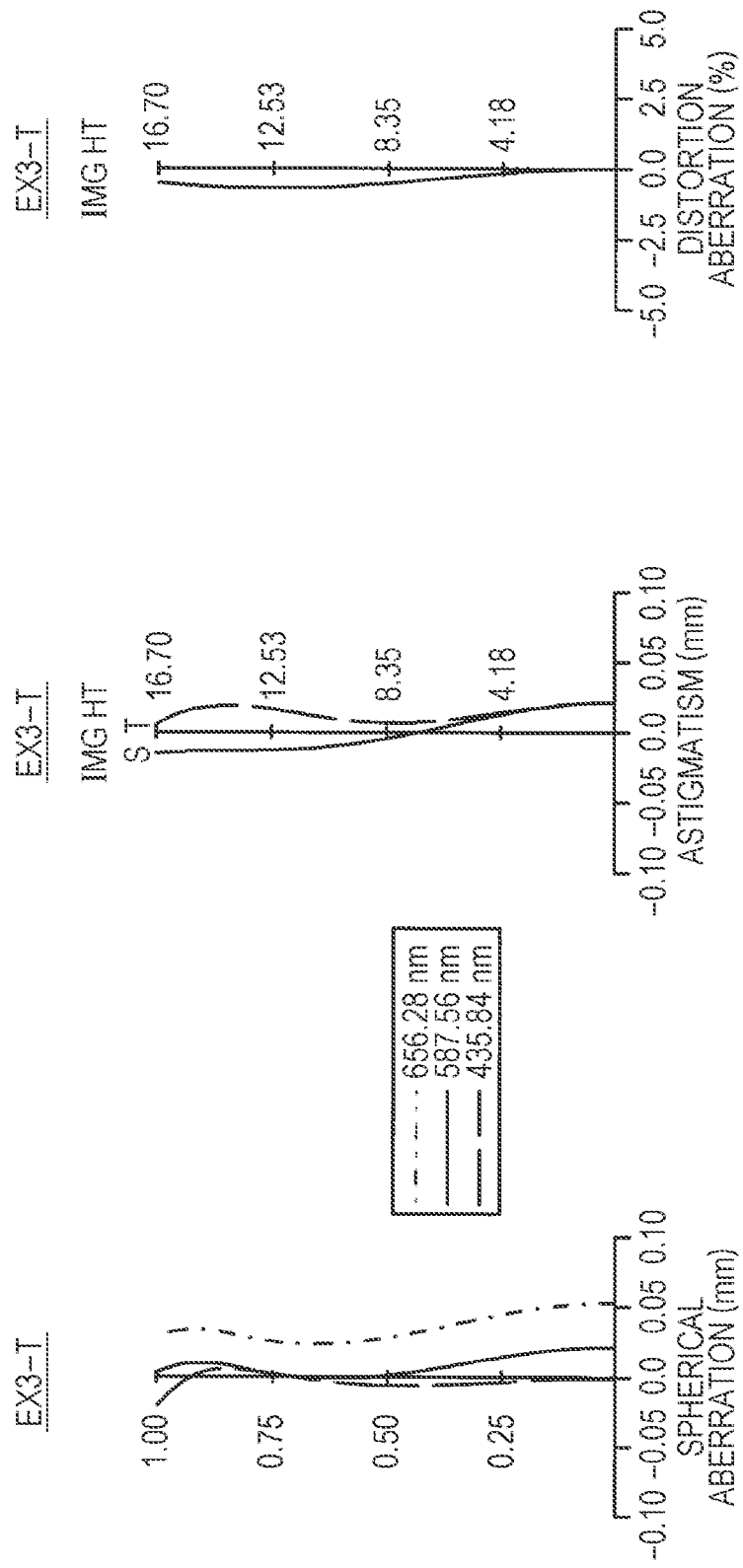

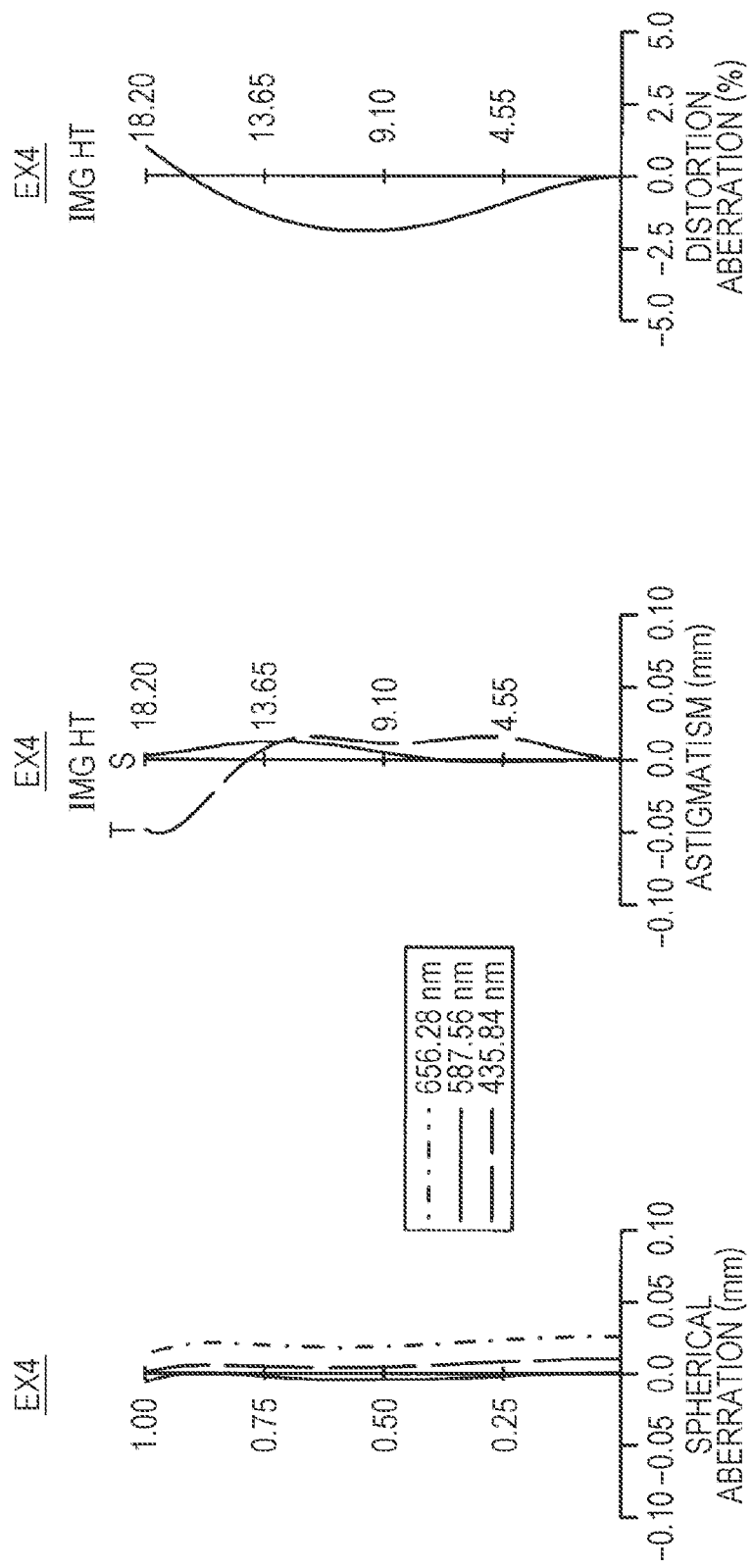

PROJECTION OPTICAL SYSTEM AND PROJECTION APPARATUS THAT ENLARGE AND PROJECT AN IMAGE DISPLAYED ON A DISPLAY

CROSS-REFERENCE TO RELATED APPLICATIONS

This application is a continuation of U.S. patent application Ser. No. 16/395,370 filed on Apr. 26, 2019, which claims priority from Japanese patent Application No. 2017-083758 filed on Apr. 20, 2017, the contents of which are incorporated by reference in their entirety.

TECHNICAL FIELD

The present invention relates to a projection optical system and a projection apparatus, and more particularly, to a projection optical system suitable for enlarging and projecting, on a screen, a display image of an image display element such as a digital micromirror device or a liquid crystal display (LCD) with a wide angle of view exceeding 100° and a projection apparatus having the projection optical system.

BACKGROUND

In recent years, a projection apparatus with a wide angle of view that can perform large screen projection with a short projection distance has been required. In order to realize such a projection apparatus with a wide angle of view, it is effective to adopt a relay-type projection optical system that forms an intermediate image at a time. However, in this case, the total length of the projection optical system is extended, and the projection apparatus main body is also lengthened, so that the effect of shortening the projection distance becomes small. As a countermeasure therefor, a projection optical system with a wide angle of view in which the total length of the projection apparatus main body is shortened by bending a projection light path is proposed in JP 2008-536175 A and JP 2006-523318 A.

Herein, in the relay-type projection optical system, an enlargement-side portion of the intermediate image is set as a first optical system, and a reduction-side portion of the intermediate image is set as a second optical system. In the projection optical system described in JP 2008-536175 A, the light path in the first optical system is bent, and the light path between the first optical system and the second optical system is also bent. Therefore, many optical elements for bending the light path are used, so that cost is increased. In the projection optical system described in JP 2006-523318 A, the light path is not bent in the first optical system, but the light path is bent at the position of the intermediate image. Therefore, in order to shorten the projection optical system in the projection direction, it is necessary to shorten the first optical system for projecting the intermediate image onto the screen, and thus, it is difficult to achieve both of the wide angle of view of the projection and the high image quality of the projected image.

SUMMARY

One or more embodiments are directed to a projection optical system that enlarges and projects an image displayed on an image display surface. The projection optical system includes: a first optical system; and a second optical system. The projection optical system is a monofocal lens or a zoom lens. The first optical system and the second optical system are arranged, in order starting with the first optical system, from an enlargement side of the projection optical system. The second optical system forms an intermediate image of the image between the first optical system and the second optical system. The first optical system enlarges and projects the intermediate image. The first optical system includes: a first-A optical system and a first-B optical system in order from the enlargement side; and a reflecting optical element that bends a light path between the first-A optical system and the first-B optical system. The first-A optical system includes: a negative front group including a negative lens closest to a reduction side; and a rear group including three positive lenses. The light path is bent only once by 90 degrees.

One or more embodiments are directed to a projection apparatus that includes: an image display element including an image display surface; and a projection optical system that enlarges and projects an image displayed on the image display surface. The projection optical system includes a first optical system and a second optical system in order from an enlargement side of the projection optical system. The second optical system forms an intermediate image of the image between the first optical system and the second optical system. The first optical system enlarges and projects the intermediate image. The first optical system includes: a first-A optical system and a first-B optical system in order from the enlargement side; and a reflecting optical element that bends a light path between the first-A optical system and the first-B optical system. The first-A optical system includes: a negative front group including a negative lens closest to a reduction side; and a rear group including three positive lenses. The light path is bent only once by 90 degrees.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention:

FIGS. 9A to 9C are aberration diagrams of Example 1.
FIGS. 10A to 10C are aberration diagrams of Example 2.
FIGS. 11A to 11I are aberration diagrams of Example 3.
FIGS. 12A to 12C are aberration diagrams of Example 4.

DETAILED DESCRIPTION

Hereinafter, a projection optical system, a projection apparatus, and the like according to one or more embodiments of the invention will be described with reference to the drawings. However, the scope of the invention is not limited to the disclosed embodiments. The projection optical system according to one or more embodiments of the invention is a projection optical system enlarging and projecting an image displayed on an image display surface, and the projection optical system is a monofocal lens including a first optical system and a second optical system in order from an enlargement side, the second optical system forms an intermediate image of the image between the first optical system and the second optical system, the first optical system enlarges and projects the intermediate image, the first optical system includes a first-A optical system and a first-B optical system in order from the enlargement side and includes a reflecting optical element for bending an light path between the first-A optical system and the first-B optical system.

A projection apparatus according to one or more embodiments of the invention is a projection apparatus including an image display element having an image display surface and a projection optical system enlarging and projecting an image displayed on the image display surface, the projection optical system includes a first optical system and a second optical system in order from the enlargement side, the second optical system forms an intermediate image of the image between the first optical system and the second optical system, the first optical system enlarges and projects the intermediate image, and the first optical system includes a first-A optical system and a first-B optical system in order from the enlargement side and includes a reflecting optical element for bending the light path between the first-A optical system and the first-B optical system.

The "enlargement side" is the direction of the screen surface (enlargement side image surface) on which an enlarged optical image is projected (so-called front side), and the opposite direction is the "reduction side", that is, the direction in which an image display element (for example, a digital micromirror device) displaying an original optical image on the image display surface (reduction side image surface) is to be arranged (so-called rear side).

Figure 13:
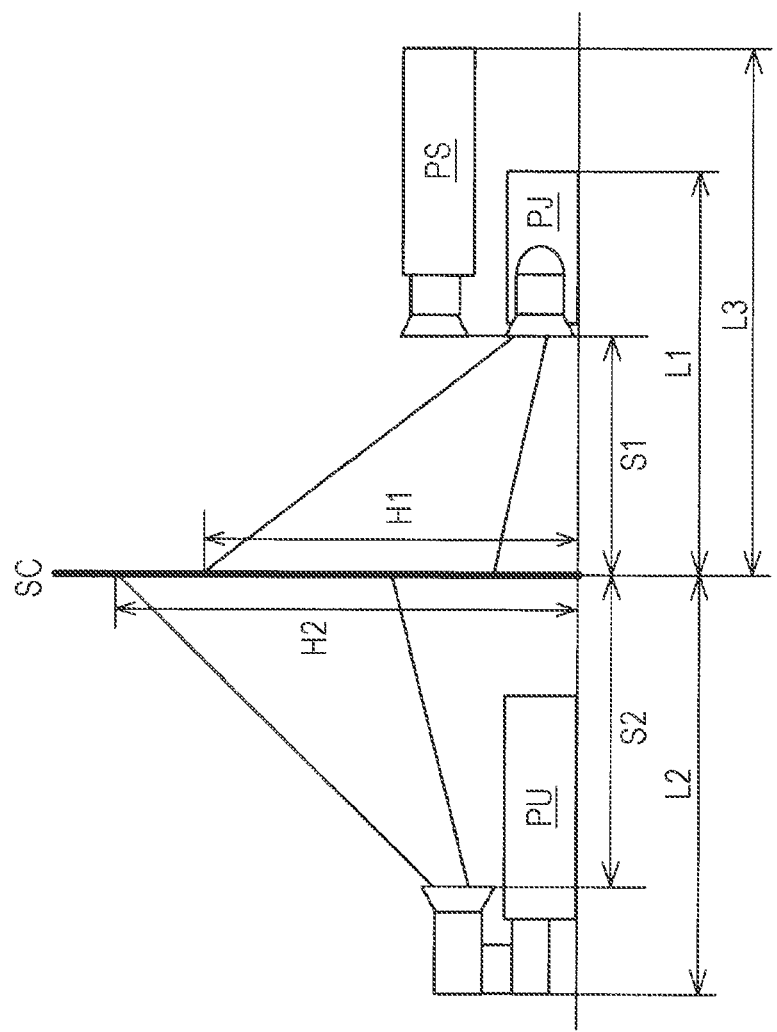
FIG. 13 is a schematic diagram illustrating a projection distance and a projection-direction size of a projection apparatus according to one or more embodiments of the invention.

Herein, the effects of bending the light path will be described. FIG. 13 schematically illustrates three types of projection apparatuses PU, PS, and PJ. In the type of the projection apparatus PU of making a U-turn of the light path, the projection distance is S2, the projection-direction length of the projection apparatus main body is L2, and the height of the upper end of the projection range is H2. In the straight-type projection apparatus PS without bending of the light path, the projection distance is S1, the projection-direction length of the projection apparatus main body is L3, and the height of the upper end of the projection range is H1. In the type of the projection apparatus PJ of bending the light path in the lateral direction (direction parallel to the screen surface SC), the projection distance is S1, the projection-direction length of the projection apparatus main body is L1, and the height of the upper end of the projection range is H1. The magnitude relations of the sizes are S1<S2, L1<L2<L3, and H1<H2.

In the type of the projection apparatus PU of making a U-turn of the light path, in order to prevent the light path from interfering with the projection apparatus main body, the projection position is shifted upward to the height H2. Therefore, the type cannot cope with a case where the ceiling is low, and thus, it is difficult to perform large screen projection. In the straight-type projection apparatus PS without bending of the light path, even if the projection distance S1 is short, since the projection optical system itself becomes longer, the size L3 of the apparatus main body becomes longer in the projection direction. In the type of the projection apparatus PJ in which the light path is bent in the lateral direction, since the light path is bent in the first optical system located to be closer to the enlargement side than to the intermediate image IM1, the size L1 of the apparatus main body is shortened in the projection direction.

In the relay-type projection optical system which forms an intermediate image, it is easy to achieve a wide angle of view capable of performing large screen projection, but the total length of the projection optical system tends to become long. Even in a case where such a projection optical system is used in the projection apparatus, it is possible to shorten the total length in the projection direction of the projection optical system by bending the light path in the first optical system close to the enlargement side. Therefore, similarly to the projection apparatus PJ illustrated in FIG. 13, it is possible to perform large screen projection in a space smaller than those of the projection apparatuses PU and PS in the related art.

In addition, the projection optical system according to one or more embodiments of the invention is configured so that, in the case of the monofocal lens, the following conditional formulas (1) and (2) are satisfied in an infinity in-focus state, and in the case of the zoom lens, the following conditional formulas (1) and (2) are satisfied in an infinity in-focus state in the shortest focal length state:

$$0.18 < Ta/Tw < 0.4 \qquad (1)$$

$$1 < |fa/|fw| < 15 \qquad (2)$$

provided that,

Ta is an on-axis distance from the lens surface closest to the enlargement side to the lens surface closest to the reduction side in the first-A optical system, Tw is an on-axis distance from the lens surface closest to the enlargement side to the lens surface closest to the reduction side in the projection optical system, fa is a focal length of the first-A optical system, and fw is a focal length of the entire projection optical system.

The conditional formula (1) defines a ratio of the total length Ta of the first-A optical system to the total length Tw of the projection optical system. If the ratio exceeds the upper limit of the conditional formula (1), the first-A optical system becomes long, and thus, the projection-direction length of the projection optical system becomes long. If the ratio falls below the lower limit of the conditional formula (1), the first-A optical system becomes too short, and thus, the reflecting optical element becomes large, so that cost is increased. In addition, even in a case where the ratio falls down the lower limit of conditional formula (1), if the focal length of the first-A optical system is shortened in order to reduce the size of the reflecting optical element, in particular, distortion tends to occur, so that the image quality of the projected image is deteriorated. Therefore, by satisfying the conditional formula (1), it is possible to shorten the projection-direction length of the projection optical system while suppressing the size of the reflecting optical element and to improve the image quality of the projected image.

The conditional formula (2) defines a ratio of the focal length fa of the first-A optical system to the focal length |fw| of the projection optical system. If the ratio exceeds the upper limit of the conditional formula (2), the focal length of the first-A optical system becomes too long, and if it is attempted to perform projection at a wide angle of view, the reflecting optical element becomes large, so that cost is increased. If the ratio falls below the lower limit of the conditional formula (2), the focal length of the first-A optical system becomes too short, in particular, distortion occurs, so that the image quality of the projected image is deteriorated. Therefore, by satisfying the conditional formula (2), it is possible to shorten the projection-direction length of the projection optical system while suppressing the size of the reflecting optical element and to improve the image quality of the projected image.

In the projection optical system or projection apparatus having the characteristic configuration described above, since the reflecting optical element for bending the light path is configured to be provided inside the first optical system located on the enlargement side of the intermediate image, it is possible to reduce the projection-direction length of the projection optical system, to widen the angle of view of the projection, and to improve the image quality of the projected image without using many optical elements for bending the light path. Therefore, it is possible to realize a projection optical system that can perform large screen projection with high image quality with a short projection distance and can shorten the projection-direction length of the projection apparatus main body at a low cost and a projection apparatus including the projection optical system. Further, since the projection optical system has a configuration that satisfies the conditional formulas (1) and (2), effects thereof are further increased. The conditions for obtaining such effects in a well-balanced manner and achieving higher optical performance, miniaturization, and the like will be described below.

It is preferable to satisfy the following conditional formula (1a).

$$0.2 < Ta/Tw < 0.3 \tag{1a}$$

The conditional formula (1a) defines a further preferable condition range based on the viewpoint and the like among the condition ranges defined by the conditional formula (1). Therefore, preferably, by satisfying the conditional formula (1a), it is possible to further increase the above effects.

It is preferable to satisfy the following conditional formula (2a).

$$2 \leq fa/|fw| < 12 \tag{2a}$$

The conditional formula (2a) defines a further preferable condition range based on the viewpoint and the like among the condition ranges defined by the conditional formula (2). Therefore, preferably, by satisfying the conditional formula (2a), it is possible to further increase the above effects.

In a case where the projection optical system is a monofocal lens, it is preferable that the projection optical system satisfies the following conditional formula (3) in the infinity in-focus state, and in a case where the projection optical system is a zoom lens, it is preferable that the projection optical system satisfies the following conditional formula (3) in the infinity in-focus state in the shortest focal length state:

$$0.1 < Tb/Tw < 0.3 \tag{3}$$

provided that,

Tb is an on-axis distance from the lens surface closest to the enlargement side to the lens surface closest to the reduction side in the first-B optical system, and Tw is an on-axis distance from the lens surface closest to the enlargement side to the lens surface closest to the reduction side in the projection optical system.

The conditional formula (3) defines a ratio of the total length Tb of the first-B optical system to the total length Tw of the projection optical system. In a case where the ratio falls below the lower limit of the conditional formula (3), the first-B optical system is too short, and thus, it difficult to correct off-axis aberration, particularly, curvature of image field, in the first-B optical system. Therefore, in order to obtain good optical performance with a wide angle of view, it is necessary to increase the size of the first-A optical system, so that the size of the entire projection optical system may be greatly increased. The ratio's falling below the upper limit of conditional formula (3) denotes that the first-B optical system becomes longer. In order to cope with this, it is necessary to take a long back focus of the first-A optical system. However, in this case, it is necessary to take a large refractive power of the rear group of the first-A optical system as described later. As a result, the height of the off-axis ray passing near the reflecting optical element becomes high, and thus, it becomes necessary to increase the size of the reflecting optical element, so that cost may be increased. Therefore, it is preferable that the ratio is within the range of the conditional formula (3), and by satisfying the conditional formula (3), it is possible to achieve miniaturization and high performance of the projection optical system in a well-balanced manner while suppressing the size of the reflecting optical element.

It is preferable to satisfy the following conditional formula (3a).

$$0.15 < Tb/Tw < 0.25 \tag{3a}$$

The conditional formula (3a) defines a further preferable condition range based on the viewpoint and the like among the condition ranges defined by the conditional formula (3). Therefore, preferably, by satisfying the conditional formula (3a), it is possible to further increase the above effects.

It is preferable that the first-A optical system includes a negative front group including a negative lens closest to the reduction side and a rear group including only positive lenses in order from the enlargement side. That is, it is preferable that, the first-A optical system is divided into two groups at the interval between the negative lens on the enlargement side and the positive lens on the reduction side, the enlargement side is set as a negative front group, and the reduction side is set as a rear group including only positive lenses. According to this configuration, since the first-A optical system has a retrofocus type refractive power arrangement, it is possible to take a long back focus of the first-A optical system. Therefore, it is possible to easily secure a space for inserting the reflecting optical element into the reduction side of the first-A optical system.

It is preferable that the front group includes one positive lens or less. According to this configuration, in order to realize a wide angle of view, it is possible to reduce the front group that tends to be large in the first-A optical system. Therefore, it is possible to more effectively shorten the projection-direction length of the projection apparatus main body.

It is preferable that the rear group includes three positive lenses. According to this configuration, since the positive refractive power of the rear group can be increased with the minimum number of lenses in the first-A optical system, the space for inserting the reflecting optical element can be made more easily secured without increasing the total length of the first-A optical system.

In a case where the projection optical system is a monofocal lens, it is preferable that the following conditional formula (4) is satisfied in the infinity in-focus state. In a case where the projection optical system is a zoom lens, it is preferable that following conditional formula (4) is satisfied in the infinity in-focus state in the shortest focal length state:

$$-0.4 < faf/fa < -0.05 \qquad (4)$$

provided that, faf is a focal length of the front group, and fa is a focal length of the first-A optical system.

The conditional formula (4) defines a refractive power ratio of the front group to the first-A optical system. In a case where the refractive power ratio falls below the lower limit of the conditional formula (4), the refractive power of the front group in the first-A optical system becomes too small, and thus, the front group in the first-A optical system tends to become large. In addition, since the back focus of the first-A optical system is shortened, it is necessary to shorten the first-B optical system in order to secure the space for inserting the reflecting optical element, and thus, it is difficult to reduce the off-axis aberration, particularly, the curvature of image field. In addition, in a case where the refractive power ratio exceeds the upper limit of the conditional formula (4), the refractive power of the front group in the first-A optical system becomes too large, distortion aberration particularly increases in the front group, so that projected image quality may be deteriorated. Therefore, it is preferable that the refractive power ratio is within the range of the conditional formula (4), and by satisfying the conditional formula (4), it is possible to achieve miniaturization and high performance of the projection optical system in a well-balanced manner while suppressing the size of the reflecting optical element.

It is preferable that the first-A optical system includes a first focusing part that moves during focusing, and the first-B optical system or the second optical system includes a second focusing part that moves during focusing. In a case where focusing is performed in the first-A optical system, since the on-axis ray and the off-axis ray are separated from each other, if an error occurs at the in-focus position due to a manufacturing error or the like, aberration deterioration such as curvature of image field tends to occur. In that case, correction is not performed in the first focusing part, the second focusing part is provided inside the first-B optical system or the second optical system so that the on-axis ray and the off-axis ray pass through the positions close to each other, and a manufacturing error or the like is corrected by the second focusing part. Therefore, it is possible to prevent deterioration of off-axis aberration and to maintain high image quality of the projected image. However, in a case where focusing is performed by only the second focusing part without using the first focusing part, in general, the movement amount by focusing also tends to increase in the places where aberration deterioration due to focusing is small, so that the entire projection optical system tends to become large. Therefore, if the focusing is mainly performed by the movement of the first focusing part and the focusing in the second focusing part is limited to fine adjustment, it is possible to effectively prevent the projection optical system from becoming large while maintaining high image quality of the projected image.

It is preferable that the first optical system and the second optical system are on the same optical axis. According to this configuration, a stable image quality can be obtained both in the case of being projected on the upper side of the projection optical system and in the case of being projected on the lower side, and thus, it is possible to increase the number of options for the installation place of the projection optical system.

It is preferable that the second optical system and the entire projection optical system are substantially telecentric on the reduction side. According to this configuration, it is possible to increase the efficiency at the time of capturing the illumination light, and it is possible to prevent deterioration of the image quality.

It is preferable that the projection optical system is a zoom lens that performs zooming by moving a lens group configured as a portion of the second optical system along the optical axis. According to this configuration, the screen size can be adjusted according to the situation, and thus, it is possible to further increase a degree of freedom of installation. In addition, since the interval for bending can be easily maintained by performing zooming with only the second optical system, it is possible to maintain the projection-direction length of the projection apparatus small all the time.

It is preferable that an angle between an optical axis in the light path from the image display surface to the projection optical system and an optical axis in the light path from the projection optical system to the enlargement/projection side is in a range of 60 degrees to 120 degrees. If the angle falls below the lower limit of 60 degrees, the projection apparatus becomes such a type (projection apparatus PU in FIG. 13) that projection is performed by bending the light path back on the projection apparatus main body side. In this case, since it is necessary to perform projection with avoiding the light path from interfering with the projection apparatus main body, projection is performed only at a high position, and thus, it is difficult to perform large screen projection in a room with a low ceiling. If the angle exceeds the upper limit of 120 degrees, the projection apparatus becomes approximate to such a type that bending the light path is not performed (the projection apparatus PS in FIG. 13), the projection-direction length due to the bending of the light path cannot be reduced, and thus, it is difficult to perform large screen projection in a narrow space. Therefore, if the conditions of the angle range are satisfied, it is possible to perform large screen projection with a more compact projection configuration. From such a viewpoint, it is more preferable that an angle between an optical axis in the light path from the image display surface to the projection optical system and an optical axis in the light path from the projection optical system to the enlargement/projection side is in a range of 80 degrees to 100 degrees.

It is preferable that the light path by the reflecting optical element is bent only once. According to this configuration, only one space is required for bending the light path, and it is possible to prevent the projection lens from becoming large.

It is preferable that the reflecting optical element is a plane mirror. According to this configuration, it is possible to minimize the increase in cost due to the reflecting optical element for bending the light path.

It is preferable that the reflecting optical element is a triangular prism, and the light path is bent by using an oblique side of the triangular prism as a reflecting surface. According to this configuration, the space for bending can be buried with glass, and even if only a small air space can be taken, the light path can be bent, and the lens can be prevented from being larger.

Figure 1:
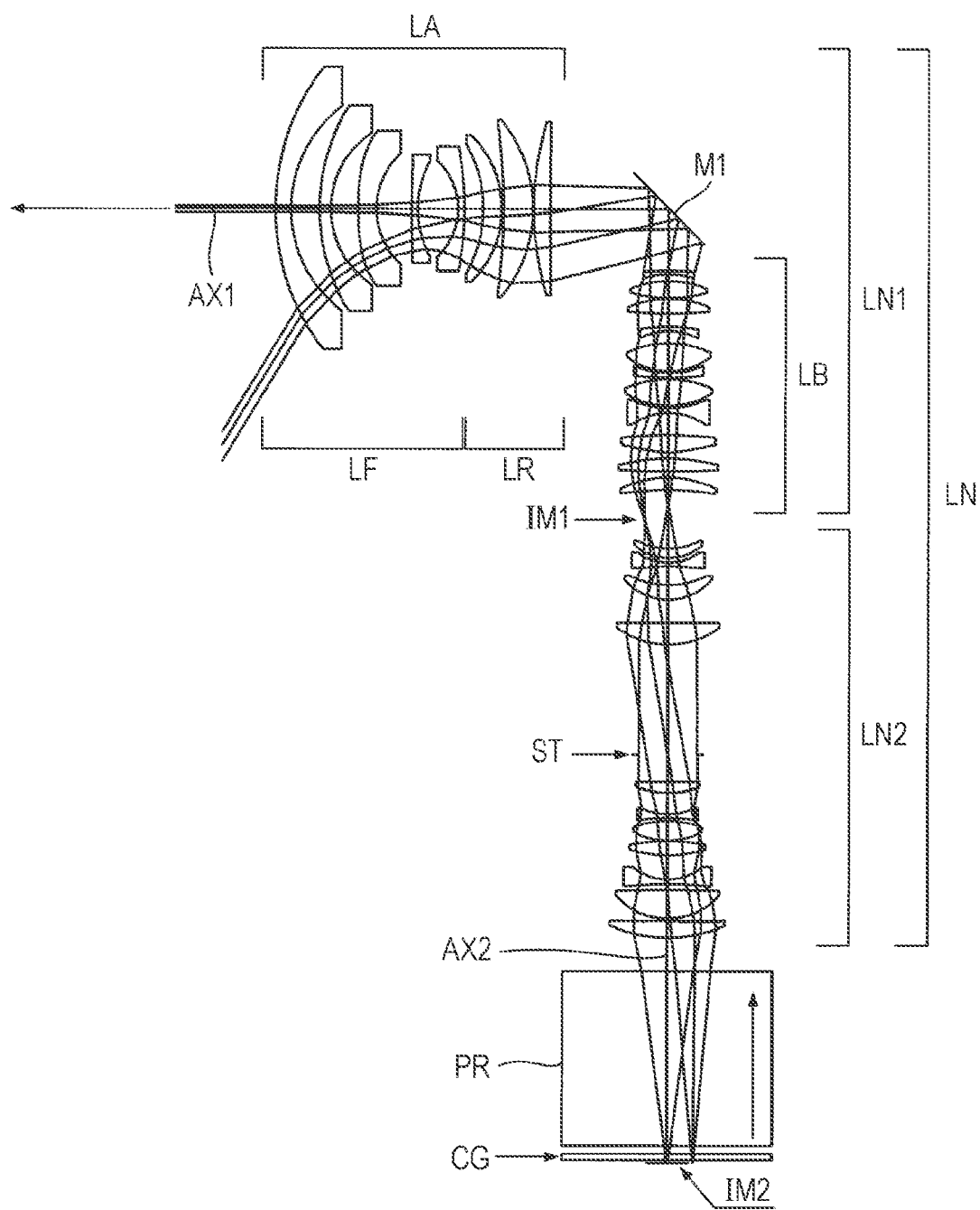
FIG. 1 is a light path diagram according to one or more embodiments of the invention (Example 1).
Figure 2:
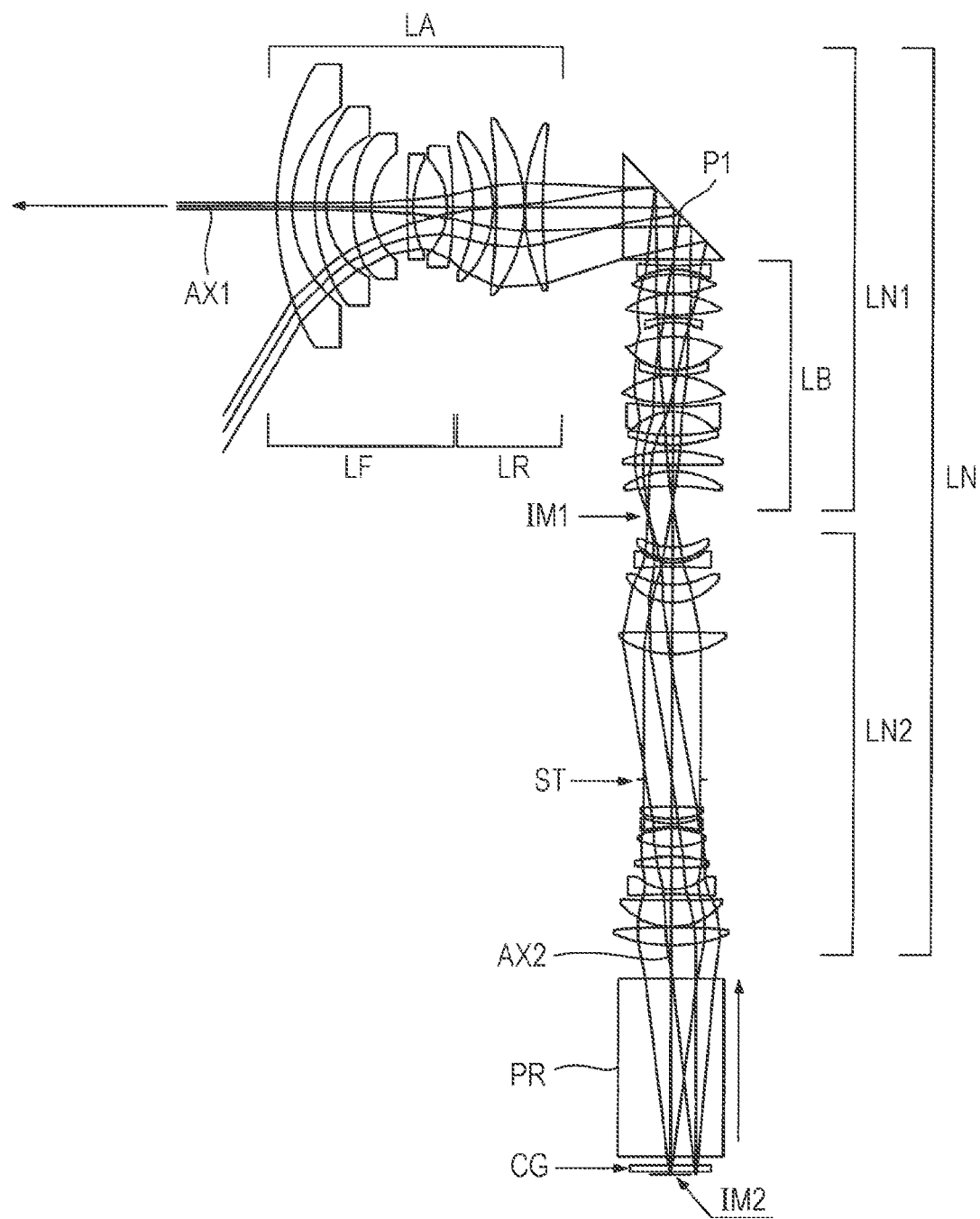
FIG. 2 is a light path diagram according to one or more embodiments of the invention (Example 2).
Figure 3:
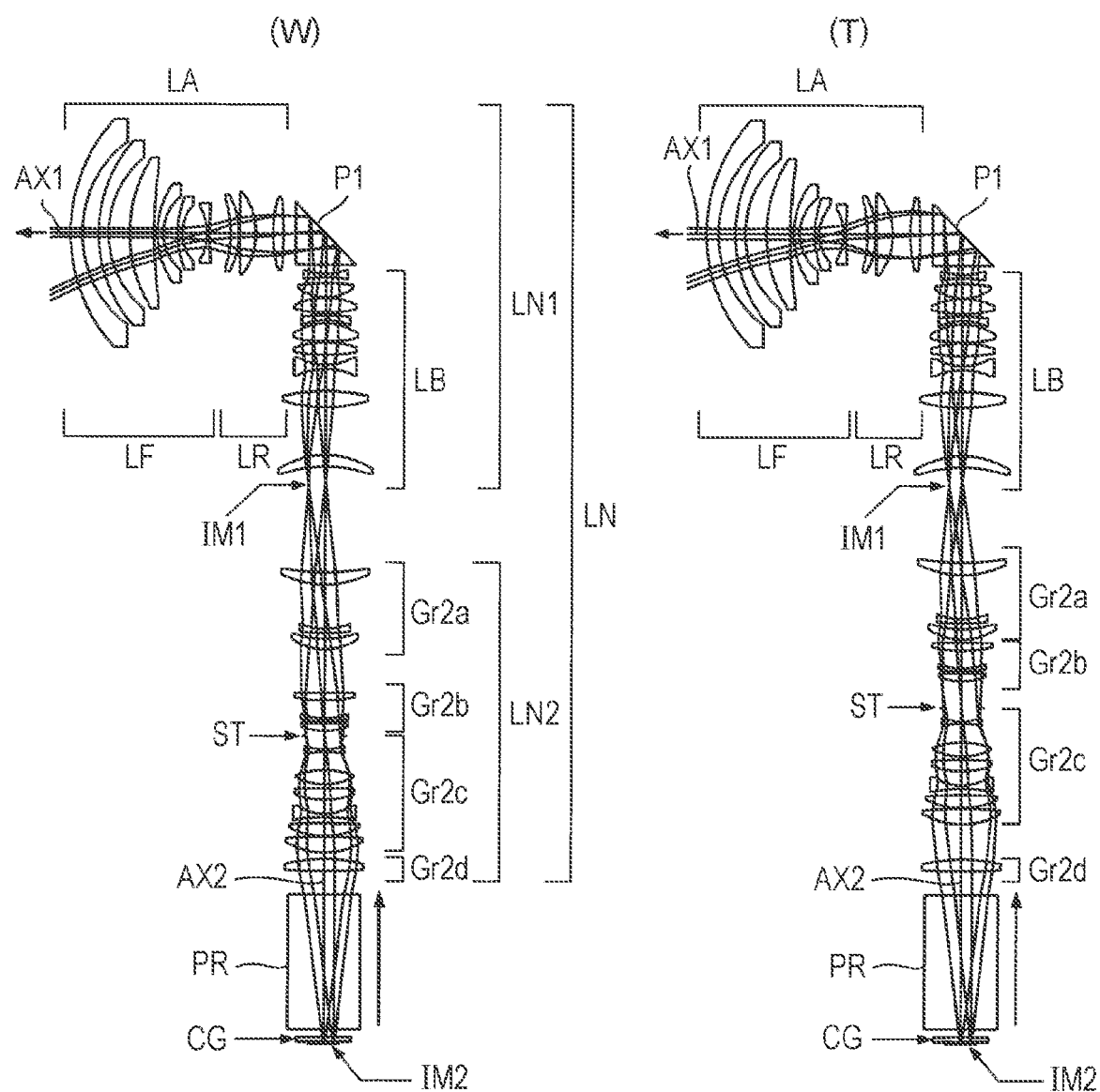
FIG. 3 is a light path diagram according to one or more embodiments of the invention (Example 3).
Figure 4:
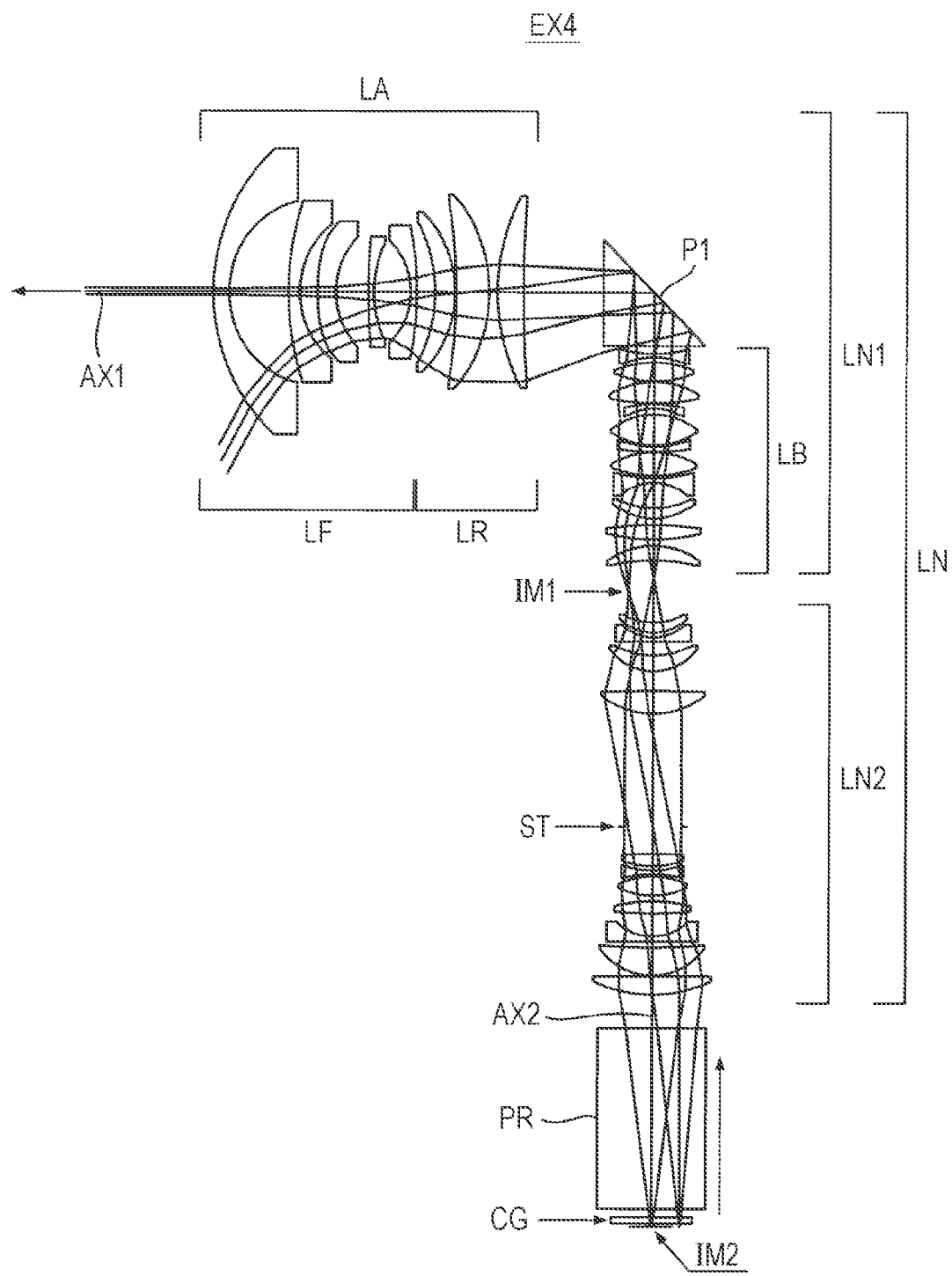
FIG. 4 is a light path diagram according to one or more embodiments of the invention (Example 4).
Figure 5:
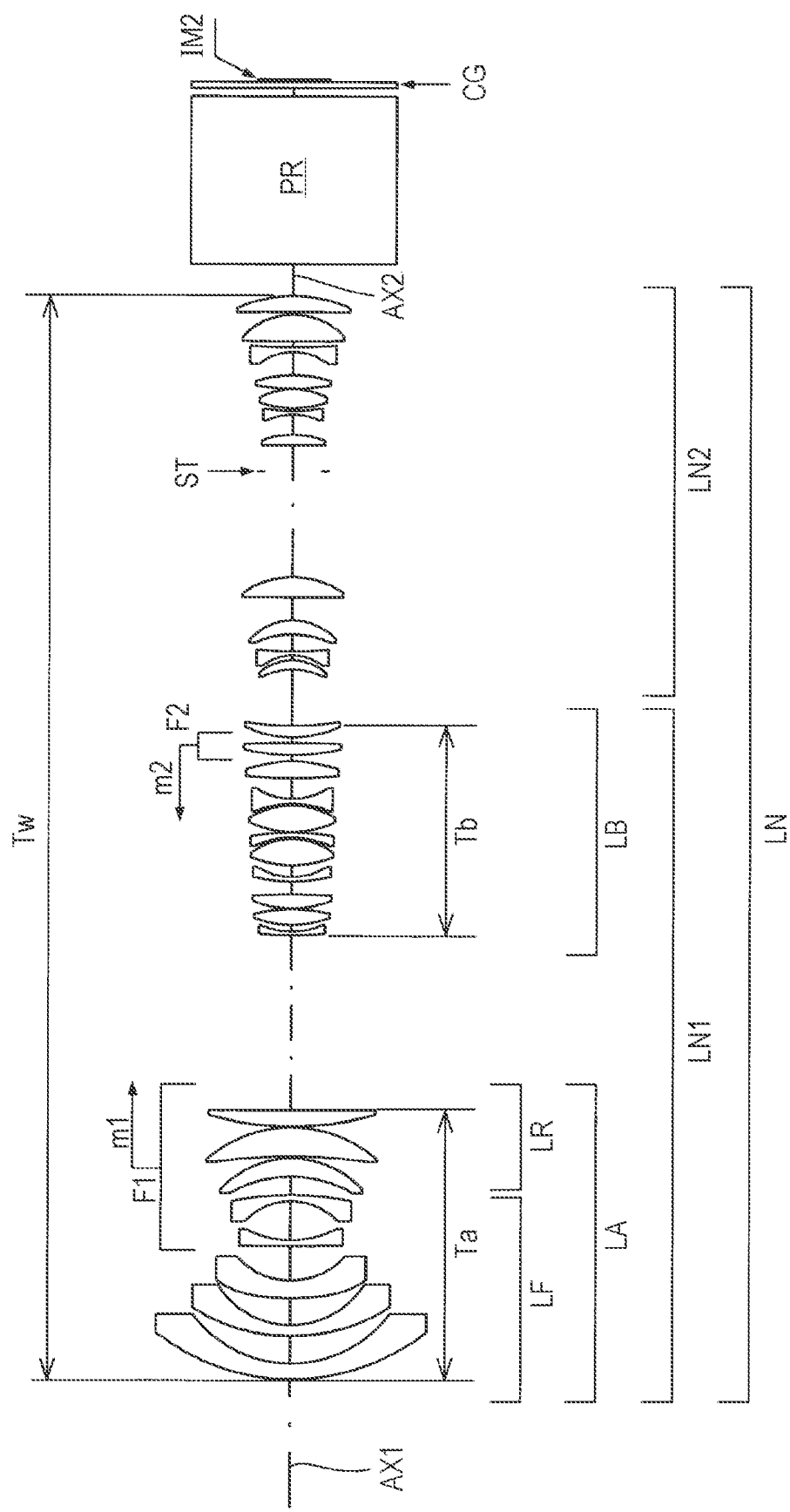
FIG. 5 is an optical configuration diagram according to one or more embodiments of the invention (Example 1).
Figure 6:
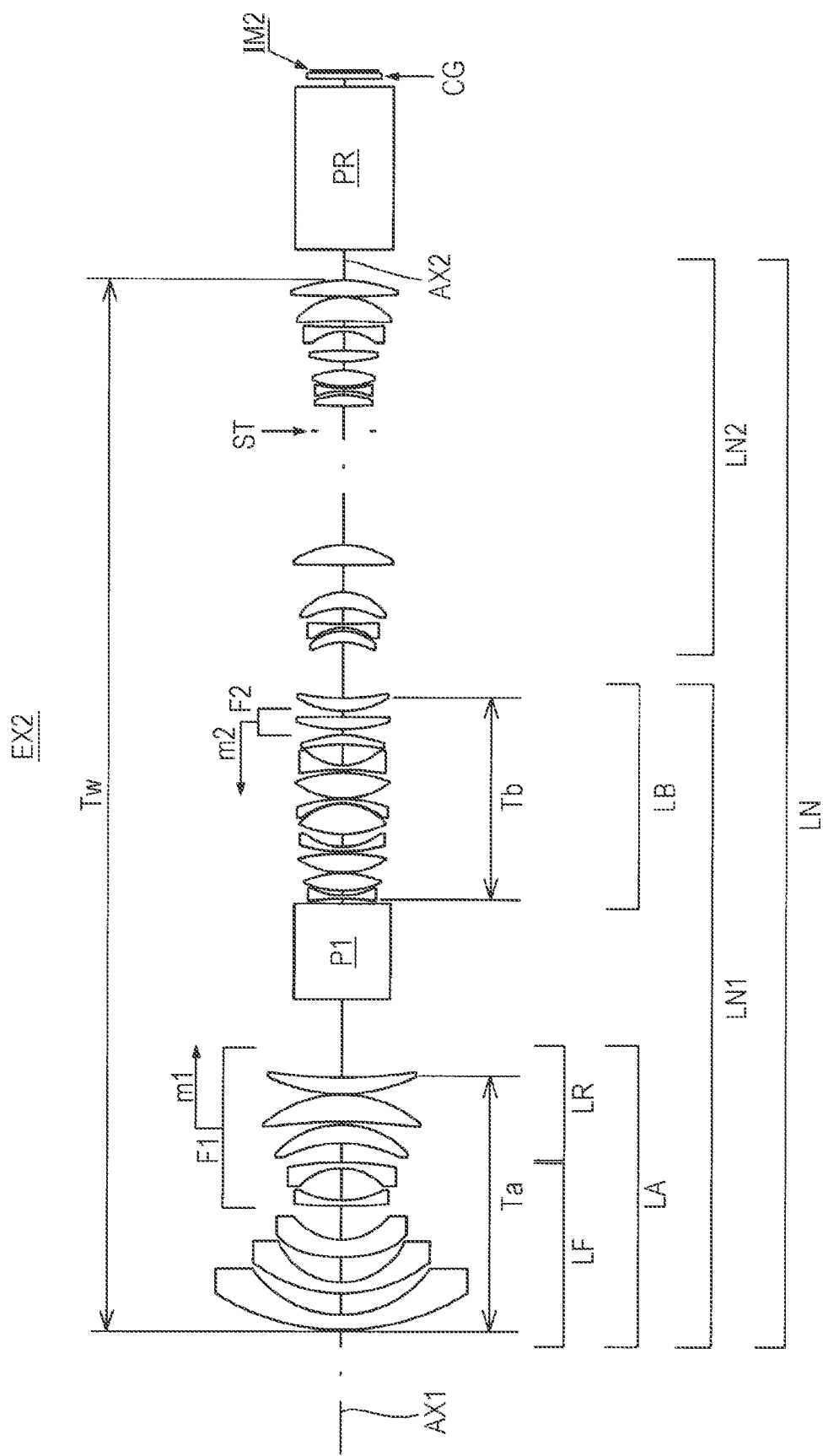
FIG. 6 is an optical configuration diagram according to one or more embodiments of the invention (Example 2).
Figure 7:
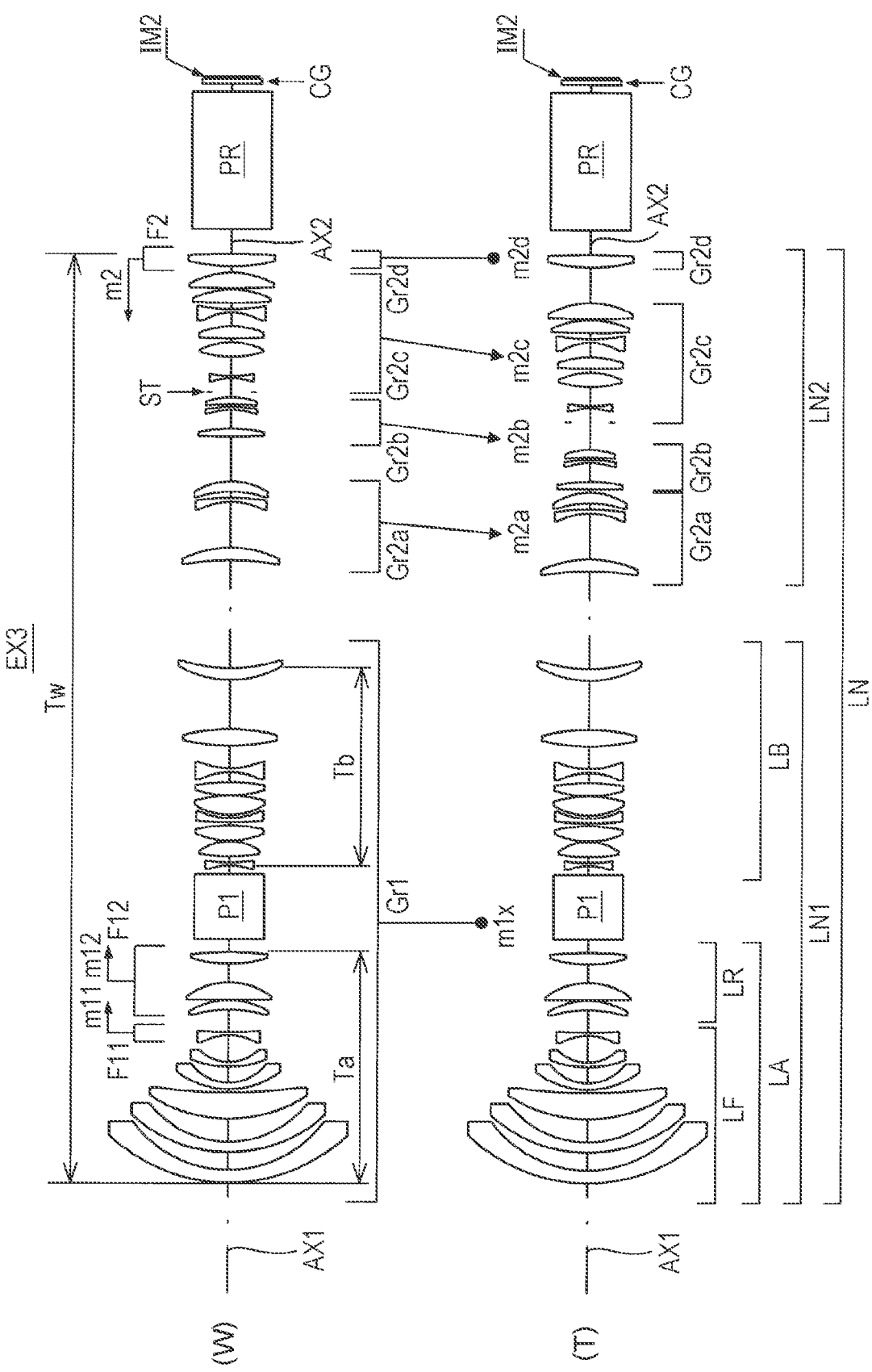
FIG. 7 is an optical configuration diagram according to one or more embodiments of the invention (Example 3).
Figure 8:
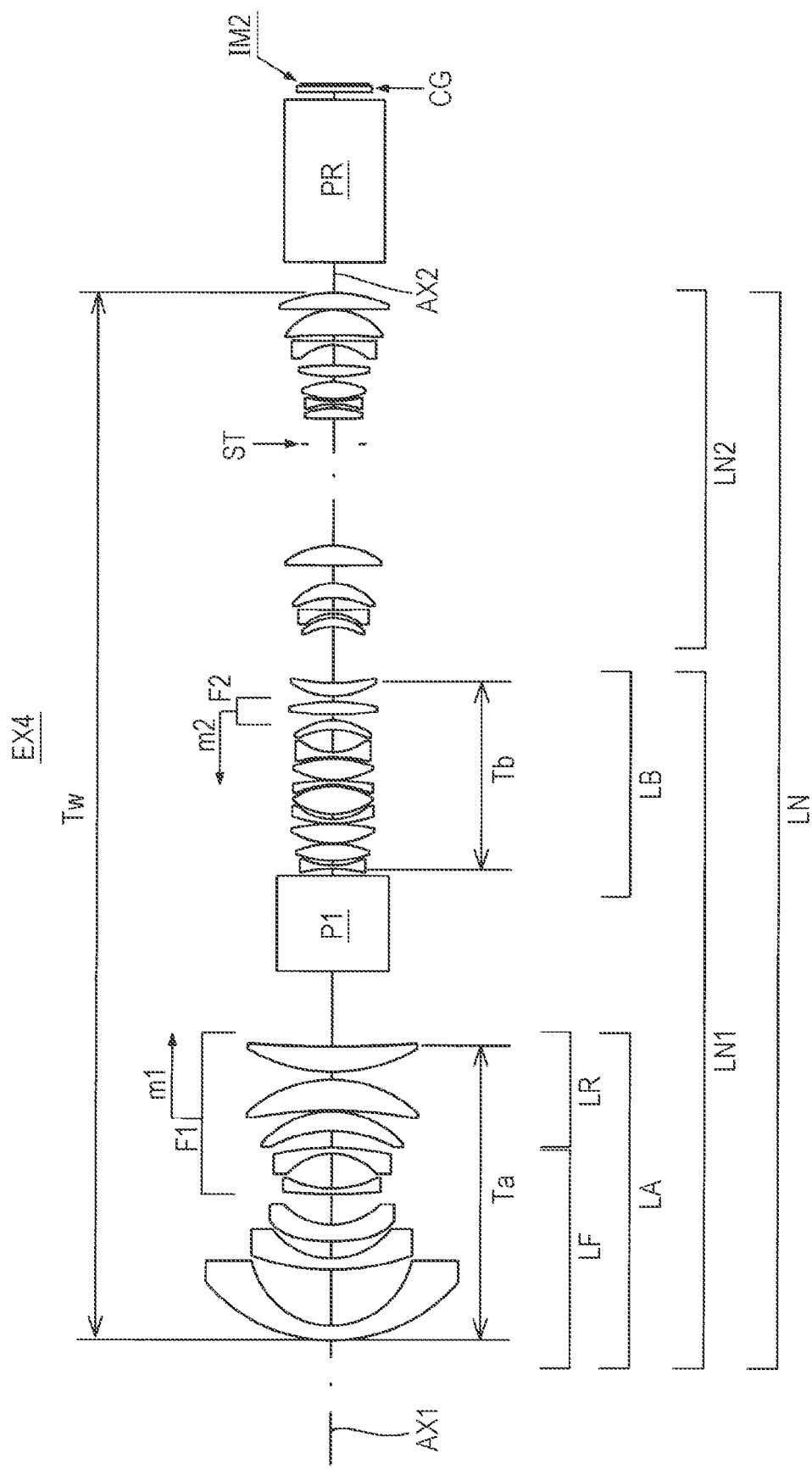
FIG. 8 is an optical configuration diagram according to one or more embodiments of the invention (Example 4).

Next, specific optical configurations of the projection optical system LN will be described in accordance with one or more embodiments of the invention. FIGS. 1, 2, and 4 are light path diagrams corresponding to the projection optical systems LN in accordance with one or more embodiments of the invention. FIGS. 5, 6, and 8 are optical configuration diagrams (developed diagrams) corresponding to the projection optical systems LN of FIGS. 1, 2, and 4, respectively. In the light path diagrams and the optical configuration diagrams, the lens cross-sectional shape, the lens arrangement, and the like of the projection optical system LN which is a monofocal lens are illustrated in an optical cross section. FIG. 3 is a light path diagram corresponding to the projection optical system LN constituting the third embodiment. FIG. 7 is an optical configuration diagram (developed diagram) corresponding to the projection optical system LN of FIG. 3. In these light path diagrams and optical configuration diagrams, the lens cross-sectional shape, the lens arrangement, and the like of the projection optical system LN, which is a zoom lens are illustrated in optical cross sections at the wide angle end (W) and the telephoto end (T), respectively. In addition, a prism PR (for example, a total internal reflection (TIR) prism, a color separation/combination prism, or the like) and a cover glass CG of the image display element are arranged on the reduction side of the projection optical system LN.

As illustrated in FIGS. 1 to 4, the projection optical system LN in accordance with one or more embodiments of the invention includes a first optical system LN1 (from the first surface to the intermediate image surface IM1) and a second optical system LN2 (from the intermediate image surface IM1 to the last lens surface) in order from the enlargement side, the second optical system LN2 forms the intermediate image IM1 of the image (reduction side image surface) displayed on the image display surface IM2 of the image display element, and the projection optical system is configured to be substantially telecentric on the reduction side where the first optical system LN1 enlarges and projects the intermediate image IM1. The projection optical system LN includes the first optical system LN1 and the second optical system LN2 on the same optical axes AX1 and AX2, and an angle between the optical axis AX2 in the light path from the image display surface IM2 to the projection optical system LN and the optical axis AX1 in the light path from the projection optical system LN1 to the enlargement/projection side is 90 degrees. In addition, the aperture stop ST is located near the center of the second optical system LN2 (for example, according to one or more embodiments, a portion closest to enlargement side in the second-c lens group Gr2c).

The first optical system LN1 includes a first-A optical system LA and a first-B optical system LB in order from the enlargement side and includes a plane mirror M1 or a triangular prism P1 between the first-A optical system LA and the first-B optical system LB as a reflecting optical element for bending the light path. In addition, the first-A optical system LA includes a negative front group LF having a negative lens closest to the reduction side and a rear group LR including only positive lenses in order from the enlargement side (retrofocus type) and, as illustrated in FIG. 5 to FIG. 8, includes a first focusing part F1 or a first focusing part F11 or F12 that moves during focusing. The first-B optical system LB or the second optical system LN2 includes a focusing part F2 that moves during focusing.

FIGS. 1 and 5 show a monofocal lens including thirty lens elements as a whole in accordance with one or more embodiments of the invention. The nineteen lenses on the enlargement side constitute a first optical system LN1 enlarging and projecting the intermediate image IM1, and the eleven lenses on the reduction side constitute a second optical system LN2 forming the intermediate image IM1. Among the lenses of the first optical system LN1, the eight lenses on the enlargement sides constitute a first-A optical system LA, and the eleven lenses on the reduction side constitute a first-B optical system LB. The first optical system LN1 includes a plane mirror M1 as a reflecting optical element for bending the light path between the first-A optical system LA and the first-B optical system LB. According to one or more embodiments, by bending the light path by 90 degrees with the plane mirror M1, the projection-direction length of the projection optical system LN is shortened, so that it is possible to improve a degree of freedom of installation of the projection apparatus PJ (FIG. 13).

FIGS. 1 and 5 show that the five lenses on the reduction side of the first-A optical system LA constitute a first focusing part F1, and the first focusing part is moved to the reduction side as indicated by the arrow m1 with focusing from the infinity to the proximity in accordance with one or more embodiments of the invention. In addition, in a case where the second single lens from the reduction side of the first-B optical system LB is a second focusing part F2, and an error occurs at the focus position of the first focusing part F1 due to a manufacturing error or the like, fine adjustment is performed with the focusing part F2. The arrow m2 indicates the movement to the enlargement side in the focusing from the infinity to the proximity at that time. In Example 1 to be described later, short distance projection up to the projection distance of 1.4 m can be performed by driving of the first focusing part F1, and the movement amount of the first focusing part F1 at that time is 0.5162 mm.

FIGS. 2, 6, 4, and 8 show monofocal lenses including thirty lens elements as a whole in accordance with one or more embodiments of the invention. The nineteen lenses on the enlargement side constitute a first optical system LN1 enlarging and projecting the intermediate image IM1, and the eleven lenses on the reduction side constitute a second optical system LN2 forming the intermediate image IM1. Among the lenses of the first optical system LN1, the eight lenses on the enlargement side constitute a first-A optical system LA, and the eleven lenses on the reduction side constitute a first-B optical system LB. The first optical system LN1 includes a triangular prism P1 with an oblique surface as a reflecting surface of a reflecting optical element for bending the light path between the first-A optical system LA and the first-B optical system LB. According to one or more embodiments of the invention, by bending the light path by 90 degrees with the triangular prism P1, the projection-direction length of the projection optical system LN is shortened, so that it is possible to improve a degree of freedom of installation of the projection apparatus PJ (FIG. 13).

FIGS. 2, 6, 4, and 8 show that the five lenses on the reduction side of the first-A optical system LA constitute a first focusing part F1, and the first focusing part is moved to the reduction side as indicated by the arrow m1 with focusing from the infinity to the proximity in accordance with one or more embodiments of the invention. In addition, in a case where the second single lens from the reduction side of the first-B optical system LB is a second focusing part F2, and an error occurs at the focus position of the first focusing part F1 due to a manufacturing error or the like, fine adjustment is performed with the focusing part F2. The arrow m2 indicates the movement to the enlargement side in the focusing from the infinity to the proximity at that time. In Examples 2 and 4 to be described later, short distance projection up to the projection distance of 1.4 m can be performed by driving the first focusing part F1, and the movement amount of the first focusing part F1 at that time is 0.5669 mm (Example 2), and 0.4364 mm (Example 4).

FIGS. 3 and 7 show a spherical lens system without an aspherical surface including thirty-one lens elements as a whole in accordance with one or more embodiments of the invention. The eighteen lenses on the enlargement side constitute a first optical system LN1 enlarging and projecting the intermediate image IM1, and the thirteen lenses on the reduction side constitute a second optical system LN2 forming the intermediate image IM1. The first optical system LN1 includes a positive first lens group Gr1 as a whole. The second optical system LN2 includes a second-a lens group Gr2a, a second-b lens group Gr2b, a second-c lens group Gr2c, a second-d lens group Gr2d which are positive, positive, positive, and positive in order from the enlargement side. The position of the intermediate image IM1 during zooming is fixed, and zooming is performed only with the second optical system LN2 (five (positive, positive, positive, positive, positive)-group zoom configuration).

The arrows m1x, m2a, m2b, m2c, and m2d in FIG. 1 schematically indicate movement or fixation of the first lens group Gr1, the second-a to second-d lens groups Gr2a to Gr2d in the zooming from the wide angle end (W) to the telephoto end (T), respectively. In other words, the first lens group Gr1 and the second-d lens group Gr2d become fixed groups, and the second-a-to second-c lens groups Gr2a to Gr2c are moving groups, and zooming is configured by allowing the second-a-to second-c lens groups Gr2a to Gr2c to move along the optical axis AX. In zooming from the wide angle end (W) to the telephoto end (T), the second-a lens group Gr2a, the second-b lens group Gr2b, and the second-c lens group Gr2c monotonically move to the enlargement side.

FIGS. 3 and 7 show that among the lenses of the first optical system LN1, the nine lenses on the enlargement side constitute a first-A optical system LA, the nine lenses on the reduction side constitute a first-B optical system LB in accordance with one or more embodiments of the invention. The first optical system LN1 includes a triangular prism P1 with an oblique surface as a reflecting surface of a reflecting optical element for bending the light path between the first-A optical system LA and the first-B optical system LB. According to one or more embodiments, by bending the light path by 90 degrees with the triangular prism P1, the projection-direction length of the projection optical system LN is shortened, so that it is possible to improve a degree of freedom of installation of the projection apparatus PJ (FIG. 13).

FIGS. 3 and 7 show that the four lenses on the reduction side of the first-A optical system LA constitute first focusing parts F11 and F12, and the first focusing part F11 including the one lens on the enlargement side and the first focusing part F12 including the three lenses on the reduction sides independently move to the reduction side as indicated by the arrows m11 and m12, so that focusing from infinity to the proximity is performed in accordance with one or more embodiments of the invention. In addition, in a case where the single lens closest to the reduction side of the second optical system LN2 is a second focusing part F2, and an error occurs at the focus position of the first focusing part F1 due to a manufacturing error or the like, fine adjustment is performed with the second focusing part F2. The arrow m2 indicates the movement to the enlargement side in the focusing from the infinity to the proximity at that time. In Example 3 to be described later, short distance projection up to the projection distance of 2.8 m can be performed by driving the first focusing part F1. The movement amount of the first focusing part F11 on the enlargement side at that time is 0.2275 mm, and the movement amount of the first focusing part F12 on the reduction side is 0.2781 mm.

As described above, according to one or more embodiments of the invention, the projection optical system LN is configured to moves the moving group relative to the image display surface IM2 to change the interval between the groups on the axis, so that the zooming from the wide angle end (W) to the telephoto end (T) is performed. Since the zoom positions of the first lens group Gr1 and the second-d lens group Gr2d are fixed, there is no change in the total length of the optical system due to the zooming, and the number of moving components is reduced, so that a zooming mechanism can be simplified. In addition, the zoom positions of the prism PR and the cover glass CG located on the reduction side of the second-d lens group Gr2d are also fixed.

In the relay-type projection optical system forming the intermediate image IM1, since the lens system tends to be long, a plane mirror M1 or a triangular prism P1 is arranged in the first optical system LN1 similarly to the embodiments, so that the projection optical system LN becomes an L-shaped bending optical system. Therefore, it is possible to effectively achieve compactification of the entire projection optical system LN. If the total length and the focal length of the first-A optical system LA are set that the conditional formulas (1) and (2) are satisfied, it is possible to shorten the projection-direction length of the projection optical system LN while suppressing the size of the reflecting optical element, and it is possible to improve the image quality of the projected image IM2.

Figure 14:
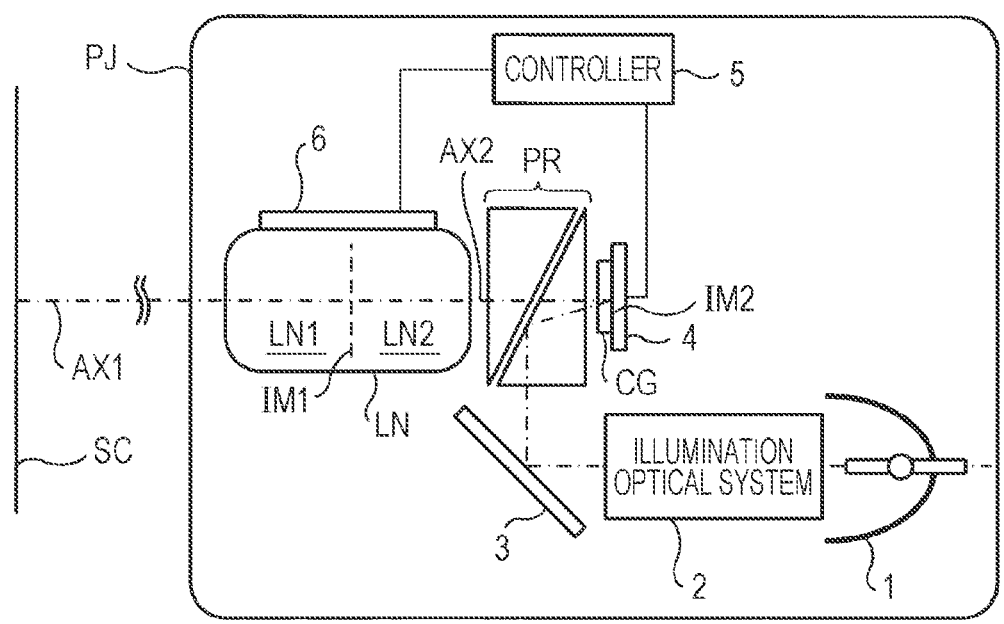
FIG. 14 is a schematic diagram illustrating one or more embodiments of a projection apparatus.

Next, one or more embodiments of a projection apparatus including the projection optical system LN will be described. FIG. 14 illustrates a schematic configuration example of the projection apparatus PJ. The projection apparatus PJ includes a light source 1, an illumination optical system 2, a reflecting mirror 3, a prism PR, an image display element (image forming element) 4, a controller 5, an actuator 6, a projection optical system LN, and the like. The controller 5 performs the overall control of the projection apparatus PJ. The image display element 4 is an image modulation element (for example, a digital micromirror device) modulating light to generate an image and has an image display surface IM2 displaying an image. A cover glass CG is provided on the image display surface IM2.

Light emitted from a light source 1 (for example, a white light source such as a xenon lamp or a laser light source) is guided to the image display element 4 by the illumination optical system 2, the reflecting mirror 3, and the prism PR, and image light is formed in the image display element 4. The prism PR is configured with, for example, a TIR prism (a color separation/combination prism or the like) and separates illumination light and projection light. The image light formed by the image display element 4 is enlarged and projected toward the screen surface SC by the projection optical system LN. That is, the image IM2 displayed on the image display element 4 becomes an intermediate image IM1 in the second optical system LN2, and after that, the image is enlarged and projected on the screen surface SC by the first optical system LN1.

As described above, the projection apparatus PJ includes the image display element 4 displaying an image, the light source 1, the illumination optical system 2 guiding light from the light source 1 to the image display element 4, and the projection optical system LN enlarging and projecting the image displayed on the image display element 4 onto the screen surface SC. However, the projection apparatus to which the projection optical system LN can be applied is not limited thereto. For example, if an image display element displaying an image by light emission of the image display surface IM2 itself is used, illumination can be made unnecessary, and in that case, the projection apparatus can be configured without using the light source 1 or the illumination optical system 2.

An actuator 6 for movement to the enlargement side or the reduction side along each optical axis AX is connected to the lens group that moves for zooming and focusing in the projection optical system LN. A controller 5 for controlling movement of the moving group is connected to the actuator 6. In addition, the lens group may be manually moved without using the controller 5 and the actuator 6.

EXAMPLES

Hereinafter, the configurations and the like of the projection optical system according to embodiments of the invention will be described in more detail with reference to construction data and the like of Examples. Examples 1 to 4 (EX 1 to EX 4) described herein are numerical examples corresponding to one or more embodiments described above. Light path diagrams and optical configuration diagrams (FIGS. 5 to 8) (FIGS. 1 to 4) illustrating one or more embodiments illustrate cross-section shapes of lenses, lens arrangement, and the like of corresponding Examples 1 to 4, respectively.

In the construction data of each Example, as surface data, from the left column, a surface number i, a radius of curvature r (mm) in a paraxial position, an on-axis surface interval d (mm), a refractive index nd for d line (wavelength 587.56 nm), and an Abbe number vd for d line are listed. In addition, SC denotes a screen surface, ST denotes an aperture stop, IM1 denotes an intermediate image surface, and IM2 denotes an image display surface.

A Surface having a surface number i attached with * is an aspheric surface, and the surface shape thereof is defined by the following formula (AS) using a local orthogonal coordinate system (x, y, z) having a surface vertex as the origin. As aspherical data, aspherical coefficients and the like are listed. In addition, with respect to the aspherical data of each Example, the coefficients of the terms having no marks are 0, and e−n=×10$^{-n}$ for all the data.

$$z=(c \cdot h^2)/[1+\sqrt{\{1-(1+K) \cdot c^2 \cdot h^2\}}]+\Sigma(Aj \cdot h^j) \quad \text{(AS)}$$

provided that, h is a height ($h^2=x^2+y^2$) in a direction perpendicular to the z axis (optical axis AX), z is a Sag amount in the direction of the optical axis AX (with reference to a vertex of the surface) at the position of the height h, c is a curvature at the vertex of the surface (a reciprocal of radius of curvature r), K is a conical constant, and Aj is a j-th order aspherical coefficient.

As various data of Examples 1, 2, and 4, focal lengths (Fl, mm), F numbers (Fno), half angle of view (ω, °), image heights (ymax, mm), total lens lengths (TL, mm), and back focuses (BF, mm) are listed. In addition, as various data of Example 3, zoom ratios are listed, and with respect to focal length states W (Wide), M (Middle), and T (Tele), the focal lengths (Fl, mm) of the entire system, F numbers (Fno.), half angle of view (ω, °), image heights (ymax, mm), total lens lengths (TL, mm), back focuses (BF, mm), and variable surface intervals (di, i: surface number, mm) are listed, and as zoom lens group data, and focal lengths mm) of each lens group are listed. In addition, with respect to the back focuses BF, the distance from the last lens surface to the paraxial image surface is expressed by an air conversion length, and the total length TL of the lens is obtained by adding the back focus BF to the distance Tw from the foremost lens surface to the last lens surface. The image height ymax corresponds to a half of the diagonal length of the image display surface IM2. The TL-BF at the wide angle end (W) corresponds to the on-axis distance Tw.

Table 1 lists values corresponding to conditional formulas, data related to the conditional formulas, and the like for each Example. In a case where the projection optical system LN is a single focus lens, the data related to the conditional formula are data in the infinity in-focus state. In a case where the projection optical system LN is a zoom lens, the data related to the conditional formula are data in the infinity in-focus state in the shortest focal length state. The projection-direction length L1 of only the projection optical system LN is data in the closest in-focus state.

The data are, for example, the on-axis distance (Ta, mm) from the lens surface closest to the enlargement side to the lens surface closest to the reduction side in the first-A optical system LA, the on-axis distance (Tb, mm) from the lens surface closest to the enlargement side to the lens surface closest to the reduction side in the first-B optical system LB, the on-axis distance (Tw, mm) from the lens surface closest to the enlargement side to the lens surface closest to the reduction side in the projection optical system LN, the focal length (fa, mm) of the first-A optical system LA, the focal length (fb, mm) of the first-B optical system LB, the focal length (fw, mm) of the entire projection optical system LN, the focal length (faf, mm) of the front group LF, the focal length (far, mm) of the rear group LR, and the projection-direction length (L1, mm, at the time of the closest in-focus) of only the projection optical system LN.

FIGS. 9A to 9C, FIGS. 10A to 10C, and FIGS. 12A to 12C are aberration diagrams (longitudinal aberration diagrams in the infinity in-focus state) corresponding to Examples 1, 2, and 4 (EX1, 2, and 4). FIGS. 9A, 10A, and 12A are spherical aberration diagrams, FIGS. 9B, 10B, and 12B are astigmatism diagrams, and FIGS. 9C, 10C, and 12C are distortion aberration diagrams. FIGS. 11A to 11I are aberration diagrams (longitudinal aberration diagrams in the infinity in-focus state) corresponding to Example 3 (EX3). FIGS. 11A to 11C illustrate various aberrations at the wide angle end W, FIGS. 11D to 11F illustrate various aberrations at the intermediate focal length state M, and FIGS. 11G to 11I illustrate various aberrations at the telephoto end T. In addition, FIGS. 11A, 11D, and 11G are spherical aberration diagrams, FIGS. 11B, 11E, and 11H are astigmatism diagrams, and FIGS. 11C, 11F, and 11I are distortion aberration diagrams.

In the spherical aberration diagram, the spherical aberration amount for d line (wavelength 587.56 nm) indicated by the solid line, the spherical aberration amount for C line (wavelength 656.28 nm) indicated by the one-dot dashed line and, the spherical aberration amount for g line (wavelength 435.84 nm) indicated by the broken line are represented by the respective shift amounts (unit: mm) in the direction of the optical axis AX from the paraxial image surface, and the vertical axis represents values (that is, relative pupil heights) obtained by normalizing incident heights on the pupil by the maximum height. In the astigmatism diagram, the broken line T represents a tangential image surface with respect to the d line, the solid line S represents a sagittal image surface with respect to the d line in terms of a shift amount (unit: mm) in the direction of the optical axis AX from the paraxial image surface, and the vertical axis represents an image height (IMG HT, unit: mm). In the distortion aberration diagram, the horizontal axis represents distortion (unit: %) with respect to the d line, and the vertical axis represents an image height (IMG HT, unit: mm).

In addition, in a case where each embodiment is used as the projection apparatus (for example, liquid crystal projection apparatus) PJ as the projection optical system LN (FIG. 14), originally, the screen surface (projected surface) SC is an image surface, and the image display surface IM2 (for example, liquid crystal panel surface) is an object plane. However, each embodiment is configured as a reduction system in terms of optical design, and the screen surface SC is assumed to be an object surface (object), and optical performance is evaluated with an image display surface (reduction side image side) IM2 corresponding to the image surface (image). As can be seen from the obtained optical performance, the projection optical system LN of each embodiment can be appropriately used not only as a projection lens for a projection apparatus but also as an imaging lens for an imaging apparatus (for example, a video camera and a digital camera).

Example 1

Unit: mm

Surface data

| i | r | d | nd | vd |
|---|---|---|---|---|
| object(SC) | infinity | infinity | | |
| 1 | 110.211 | 7.900 | 1.70154 | 41.15 |
| 2 | 61.662 | 14.014 | | |
| 3 | 91.619 | 5.700 | 1.83400 | 37.34 |
| 4 | 43.595 | 13.724 | | |
| 5* | 178.863 | 9.000 | 1.83404 | 37.30 |
| 6 | 36.274 | 17.627 | | |
| 7 | 1408.262 | 2.900 | 1.83400 | 37.34 |
| 8 | 47.851 | 19.837 | | |
| 9 | −32.235 | 3.088 | 1.84666 | 23.78 |
| 10 | −152.555 | 9.253 | | |
| 11 | −62.063 | 9.318 | 1.91082 | 35.25 |
| 12 | −48.672 | 0.954 | | |
| 13 | −277.852 | 14.450 | 1.90366 | 31.31 |
| 14 | −66.419 | 0.386 | | |
| 15 | 143.440 | 8.354 | 1.83400 | 37.34 |
| 16 | 4952.704 | 88.748 | | |
| 17 | 216.730 | 1.800 | 1.60342 | 38.01 |
| 18 | 38.511 | 3.315 | | |
| 19 | 50.863 | 8.215 | 1.43700 | 95.10 |
| 20 | −71.433 | 0.300 | | |
| 21 | 52.185 | 7.106 | 1.43700 | 95.10 |
| 22 | −254.535 | 6.549 | | |
| 23 | 83.868 | 2.229 | 1.80610 | 33.27 |
| 24 | 32.475 | 5.924 | | |
| 25 | 51.515 | 13.472 | 1.43700 | 95.10 |
| 26 | −34.405 | 0.821 | | |
| 27 | −44.313 | 2.400 | 1.80610 | 33.27 |
| 28 | −126.151 | 0.457 | | |
| 29 | 51.144 | 13.192 | 1.43700 | 95.10 |
| 30 | −41.124 | 1.018 | | |
| 31 | −47.580 | 2.463 | 1.62004 | 36.30 |
| 32 | 32.480 | 10.724 | | |
| 33 | 208.808 | 8.688 | 1.80860 | 40.42 |
| 34* | −43.010 | 3.000 | | |
| 35 | 101.251 | 6.240 | 1.85478 | 24.80 |
| 36 | −463.622 | 3.000 | | |
| 37 | 55.234 | 5.912 | 1.80518 | 25.46 |
| 38 | 138.546 | 7.721 | | |
| 39(IM1) | infinity | 21.016 | | |
| 40 | −33.329 | 4.636 | 1.51680 | 64.20 |
| 41 | −25.612 | 2.512 | | |
| 42 | −24.532 | 2.000 | 1.80610 | 33.27 |
| 43 | 204.292 | 8.796 | | |
| 44 | −42.719 | 7.130 | 1.91082 | 35.25 |
| 45 | −28.775 | 11.631 | | |
| 46 | −4887.657 | 10.348 | 1.58913 | 61.25 |
| 47 | −43.443 | 53.755 | | |
| 48(ST) | infinity | 13.131 | | |
| 49 | −3424.192 | 5.460 | 1.43700 | 95.10 |
| 50 | −44.090 | 10.337 | | |
| 51 | −30.823 | 1.800 | 1.80610 | 33.27 |
| 52 | 89.752 | 1.492 | | |
| 53 | 53.171 | 9.361 | 1.43700 | 95.10 |
| 54 | −37.488 | 0.300 | | |
| 55 | 106.711 | 6.776 | 1.59282 | 68.62 |
| 56 | −64.780 | 11.881 | | |
| 57 | −28.070 | 2.200 | 1.80610 | 40.73 |
| 58 | 211.052 | 3.078 | | |
| 59 | 1371.941 | 13.642 | 1.55032 | 75.50 |
| 60 | −34.666 | 1.216 | | |
| 61 | −3409.579 | 8.075 | 1.80518 | 25.46 |
| 62 | −71.309 | 16.128 | | |
| 63 | infinity | 85.000 | 1.51680 | 64.20 |
| 64 | infinity | 4.000 | | |
| 65 | infinity | 3.000 | 1.48749 | 70.44 |
| 66 | infinity | 1.500 | | |
| image(IM2) | infinity | | | |

Aspherical data

| i | K | A4 | A6 | A8 |
|---|---|---|---|---|
| 5 | 5.9118e+000 | 3.0980e−006 | −1.0995e−009 | 4.9448e−013 |

| i | A10 | A12 | A14 | A16 |
|---|---|---|---|---|
| 5 | −1.7938e−017 | 0.0000e+000 | 0.0000e+000 | 0.0000e+000 |

Aspherical data

| i | K | A4 | A6 | A8 |
|---|---|---|---|---|
| 34 | 0.0000e+000 | 1.8692e−005 | −2.9757e−008 | 4.1597e−011 |

| i | A10 | A12 | A14 | A16 |
|---|---|---|---|---|
| 34 | −4.1096e−014 | 1.7008e−017 | 0.0000e+000 | 0.0000e+000 |

Various data

| F1 | −7.967 |
|---|---|
| Fno. | 2.494 |
| ω | 66.360 |
| ymax | 18.200 |
| TL | 630.062 |
| BF | 79.690 |

Example 2

Unit: mm

Surface data

| i | r | d | nd | νd |
|---|---|---|---|---|
| object(SC) | infinity | infinity | | |
| 1 | 127.246 | 7.900 | 1.70154 | 41.15 |
| 2 | 58.561 | 11.368 | | |
| 3 | 76.058 | 5.700 | 1.83400 | 37.34 |
| 4 | 37.299 | 13.571 | | |
| 5* | 111.747 | 9.000 | 1.83404 | 37.30 |
| 6 | 32.610 | 17.943 | | |
| 7 | 337.299 | 2.900 | 1.83400 | 37.34 |
| 8 | 49.585 | 16.900 | | |
| 9 | −31.194 | 3.000 | 1.84666 | 23.78 |
| 10 | −172.867 | 9.900 | | |
| 11 | −69.138 | 9.702 | 1.91082 | 35.25 |
| 12 | −49.543 | 1.558 | | |
| 13 | −293.390 | 14.071 | 1.90366 | 31.31 |
| 14 | −65.725 | 0.300 | | |
| 15 | 91.438 | 8.758 | 1.83400 | 37.34 |
| 16 | 273.355 | 40.470 | | |
| 17 | infinity | 50.000 | 1.51680 | 64.20 |
| 18 | infinity | 2.804 | | |
| 19 | −136.156 | 1.800 | 1.60342 | 38.01 |
| 20 | 38.009 | 2.465 | | |
| 21 | 51.865 | 9.041 | 1.43700 | 95.10 |
| 22 | −55.273 | 0.300 | | |
| 23 | 43.509 | 9.987 | 1.43700 | 95.10 |
| 24 | −112.447 | 1.315 | | |
| 25 | 88.298 | 2.200 | 1.80610 | 33.27 |
| 26 | 32.146 | 6.853 | | |
| 27 | 55.875 | 15.616 | 1.43700 | 95.10 |
| 28 | −31.575 | 0.329 | | |
| 29 | −35.898 | 2.300 | 1.80610 | 33.27 |
| 30 | −70.078 | 0.300 | | |
| 31 | 42.131 | 13.558 | 1.43700 | 95.10 |
| 32 | −69.422 | 1.448 | | |
| 33 | −147.625 | 2.400 | 1.62004 | 36.30 |
| 34 | 28.974 | 11.077 | | |
| 35 | −110.325 | 4.931 | 1.80860 | 40.42 |
| 36* | −41.146 | 3.000 | | |
| 37 | 82.753 | 6.520 | 1.85478 | 24.80 |
| 38 | −1029.192 | 3.000 | | |
| 39 | 45.402 | 7.079 | 1.80518 | 25.46 |
| 40 | 123.932 | 8.023 | | |
| 41(IM1) | infinity | 21.319 | | |
| 42 | −33.915 | 5.835 | 1.51680 | 64.20 |
| 43 | −26.220 | 1.810 | | |
| 44 | −25.677 | 1.900 | 1.80610 | 33.27 |
| 45 | 352.708 | 8.385 | | |
| 46 | −39.914 | 8.492 | 1.91082 | 35.25 |
| 47 | −29.045 | 14.298 | | |
| 48 | 854.653 | 10.443 | 1.58913 | 61.25 |
| 49 | −48.613 | 59.995 | | |
| 50(ST) | infinity | 13.100 | | |
| 51 | 356.232 | 5.631 | 1.43700 | 95.10 |
| 52 | −44.256 | 2.058 | | |
| 53 | −41.295 | 1.700 | 1.80610 | 33.27 |
| 54 | 64.873 | 0.726 | | |
| 55 | 40.765 | 8.585 | 1.43700 | 95.10 |
| 56 | −44.784 | 4.602 | | |
| 57 | 76.791 | 5.395 | 1.59282 | 68.62 |
| 58 | −228.176 | 10.304 | | |
| 59 | −27.272 | 2.239 | 1.80610 | 40.73 |
| 60 | 341.173 | 2.892 | | |
| 61 | −702.129 | 12.707 | 1.55032 | 75.50 |
| 62 | −33.767 | 0.300 | | |
| 63 | 363.481 | 8.397 | 1.80518 | 25.46 |
| 64 | −78.776 | 16.000 | | |
| 65 | infinity | 85.000 | 1.51680 | 64.20 |
| 66 | infinity | 4.000 | | |
| 67 | infinity | 3.000 | 1.48749 | 70.44 |
| 68 | infinity | 1.500 | | |
| image(IM2) | infinity | | | |

Aspherical data

| i | K | A4 | A6 | A8 |
|---|---|---|---|---|
| 5 | 8.1195e+000 | 3.2138e−006 | −1.1472e−009 | 5.9904e−013 |

| i | A10 | A12 | A14 | A16 |
|---|---|---|---|---|
| 5 | 3.5475e−017 | 0.0000e+000 | 0.0000e+000 | 0.0000e+000 |

Aspherical data

| i | K | A4 | A6 | A8 |
|---|---|---|---|---|
| 36 | 0.0000e+000 | 1.4756e−005 | −1.8601e−008 | 2.8475e−011 |

| i | A10 | A12 | A14 | A16 |
|---|---|---|---|---|
| 36 | −3.3065e−014 | 1.7008e−017 | 0.0000e+000 | 0.0000e+000 |

Various data

| | |
|---|---|
| F1 | −7.967 |
| Fno. | 2.500 |
| ω | 66.359 |
| ymax | 18.200 |
| TL | 630.056 |
| BF | 79.556 |

Example 3

Unit: mm

Surface data

| i | r | d | nd | νd |
|---|---|---|---|---|
| object(SC) | infinity | infinity | | |
| 1 | 103.168 | 7.900 | 1.69680 | 55.46 |
| 2 | 70.921 | 11.157 | | |
| 3 | 85.761 | 6.600 | 1.80518 | 25.46 |
| 4 | 60.220 | 14.259 | | |
| 5 | 85.647 | 16.232 | 1.83400 | 37.34 |
| 6 | 292.247 | 2.192 | | |
| 7 | 51.982 | 3.900 | 1.90366 | 31.31 |
| 8 | 28.000 | 10.025 | | |
| 9 | 60.655 | 2.900 | 1.84666 | 23.78 |
| 10 | 25.616 | 16.427 | | |
| 11 | −32.708 | 1.900 | 1.91082 | 35.25 |
| 12 | 243.416 | 13.954 | | |
| 13 | −77.913 | 5.785 | 1.72916 | 54.67 |
| 14 | −46.983 | 0.300 | | |
| 15 | 3061.669 | 10.903 | 1.43700 | 95.10 |
| 16 | −41.355 | 11.379 | | |
| 17 | 79.183 | 6.988 | 1.78472 | 25.72 |
| 18 | −217.019 | 8.411 | | |
| 19 | infinity | 40.000 | 1.51680 | 64.20 |
| 20 | infinity | 5.588 | | |
| 21 | −36.083 | 2.000 | 1.90366 | 31.31 |
| 22 | 96.444 | 3.837 | | |
| 23 | 115.687 | 9.233 | 1.43700 | 95.10 |
| 24 | −31.913 | 0.300 | | |
| 25 | 49.975 | 9.487 | 1.43700 | 95.10 |
| 26 | −89.701 | 1.738 | | |
| 27 | 190.681 | 2.778 | 1.90366 | 31.31 |
| 28 | 41.106 | 2.094 | | |
| 29 | 38.798 | 11.968 | 1.43700 | 95.10 |
| 30 | −80.011 | 0.300 | | |
| 31 | 69.463 | 7.994 | 1.49700 | 81.61 |

-continued

Unit: mm

| | | | | |
|---|---|---|---|---|
| 32 | −131.816 | 6.386 | | |
| 33 | −38.983 | 2.700 | 1.60342 | 38.01 |
| 34 | 50.024 | 13.890 | | |
| 35 | 125.932 | 10.450 | 1.80518 | 25.46 |
| 36 | −102.854 | 30.797 | | |
| 37 | 60.912 | 7.290 | 1.80809 | 22.76 |
| 38 | 94.527 | 8.948 | | |
| 39(IM1) | infinity | variable | | |
| 40 | −166.927 | 7.706 | 1.90366 | 31.31 |
| 41 | −67.220 | 28.584 | | |
| 42 | −42.827 | 2.500 | 1.65844 | 50.85 |
| 43 | −144.938 | 3.817 | | |
| 44 | −65.266 | 6.607 | 1.69680 | 55.46 |
| 45 | −40.277 | variable | | |
| 46 | 947.335 | 4.924 | 1.91082 | 35.25 |
| 47 | −95.757 | 11.662 | | |
| 48 | −43.641 | 1.900 | 1.80518 | 25.46 |
| 49 | −80.170 | 1.478 | | |
| 50 | −143.575 | 4.667 | 1.48749 | 70.44 |
| 51 | −43.655 | variable | | |
| 52(ST) | infinity | 8.568 | | |
| 53 | −38.795 | 1.500 | 1.72916 | 54.67 |
| 54 | 68.421 | 12.003 | | |
| 55 | 62.681 | 8.842 | 1.43700 | 95.10 |
| 56 | −44.175 | 2.395 | | |
| 57 | 462.303 | 7.386 | 1.49700 | 81.61 |
| 58 | −54.545 | 8.797 | | |
| 59 | −33.648 | 2.200 | 1.69680 | 55.46 |
| 60 | 112.375 | 3.781 | | |
| 61 | 440.881 | 8.115 | 1.49700 | 81.61 |
| 62 | −55.250 | 0.712 | | |
| 63 | 465.977 | 9.862 | 1.49700 | 81.61 |
| 64 | −51.998 | variable | | |
| 65 | 111.804 | 7.483 | 1.49700 | 81.61 |
| 66 | −510.777 | 15.376 | | |
| 67 | infinity | 85.000 | 1.51680 | 64.20 |
| 68 | infinity | 5.000 | | |
| 69 | infinity | 3.000 | 1.48749 | 70.44 |
| 70 | infinity | 1.500 | | |
| image(IM2) | infinity | | | |

Various data
Zoom ratio 1.31

| | Wide(W) | Middle(M) | Tele(T) |
|---|---|---|---|
| F1 | −13.898 | −16.035 | −18.172 |
| Fno. | 2.444 | 2.500 | 2.565 |
| ω | 50.349 | 46.318 | 42.729 |
| ymax | 16.700 | 16.700 | 16.700 |
| TL | 658.124 | 658.129 | 658.124 |
| BF | 79.953 | 79.958 | 79.953 |
| d39 | 58.812 | 54.091 | 52.248 |
| d45 | 27.797 | 15.546 | 2.000 |
| d51 | 3.083 | 11.600 | 17.275 |
| d64 | 4.000 | 12.455 | 22.169 |

Zoom lens group data

| Group | (Surface i) | Focal length |
|---|---|---|
| Gr1 | (1-39) | 24.536 |
| Gr2a | (40-45) | 176.362 |
| Gr2b | (46-51) | 100.417 |
| Gr2c | (52-64) | 132.500 |
| Gr2d | (65-70) | 185.299 |

Example 4

Unit: mm

Surface data

| i | r | d | nd | vd |
|---|---|---|---|---|
| object(SC) | infinity | infinity | | |
| 1 | 89.112 | 7.900 | 1.70154 | 41.15 |
| 2 | 43.804 | 29.561 | | |
| 3 | 130.651 | 5.700 | 1.83400 | 37.34 |
| 4 | 39.769 | 8.976 | | |
| 5* | 125.558 | 9.000 | 1.83404 | 37.30 |
| 6 | 36.363 | 15.989 | | |
| 7 | 279.730 | 2.900 | 1.83400 | 37.34 |
| 8 | 52.127 | 18.257 | | |
| 9 | −32.080 | 3.100 | 1.84666 | 23.78 |
| 10 | −141.499 | 8.808 | | |
| 11 | −68.384 | 10.115 | 1.91082 | 35.25 |
| 12 | −51.302 | 0.475 | | |
| 13 | −246.942 | 16.259 | 1.90366 | 31.31 |
| 14 | −68.128 | 4.015 | | |
| 15 | 92.259 | 13.086 | 1.83400 | 37.34 |
| 16 | 541.440 | 39.548 | | |
| 17 | infinity | 50.000 | 1.51680 | 64.20 |
| 18 | infinity | 3.733 | | |
| 19 | −73.815 | 1.800 | 1.60342 | 38.01 |
| 20 | 41.160 | 2.464 | | |
| 21 | 57.269 | 8.836 | 1.43700 | 95.10 |
| 22 | −52.700 | 0.300 | | |
| 23 | 42.870 | 10.194 | 1.43700 | 95.10 |
| 24 | −108.726 | 0.300 | | |
| 25 | 64.778 | 2.200 | 1.80610 | 33.27 |
| 26 | 29.789 | 2.717 | | |
| 27 | 35.096 | 14.696 | 1.43700 | 95.10 |
| 28 | −38.697 | 0.720 | | |
| 29 | −46.455 | 2.300 | 1.80610 | 33.27 |
| 30 | −122.121 | 0.300 | | |
| 31 | 42.960 | 11.002 | 1.43700 | 95.10 |
| 32 | −60.090 | 1.029 | | |
| 33 | −78.059 | 2.400 | 1.62004 | 36.30 |
| 34 | 26.796 | 12.039 | | |
| 35 | −41.411 | 5.038 | 1.80860 | 40.42 |
| 36* | −25.425 | 3.000 | | |
| 37 | 178.536 | 6.668 | 1.85478 | 24.80 |
| 38 | −102.167 | 3.000 | | |
| 39 | 39.256 | 7.007 | 1.80518 | 25.46 |
| 40 | 91.921 | 8.403 | | |
| 41(IM1) | infinity | 21.199 | | |
| 42 | −30.878 | 4.677 | 1.51680 | 64.20 |
| 43 | −24.301 | 2.304 | | |
| 44 | −22.518 | 1.900 | 1.80610 | 33.27 |
| 45 | 1605.845 | 6.495 | | |
| 46 | −41.742 | 7.695 | 1.91082 | 35.25 |
| 47 | −27.309 | 9.364 | | |
| 48 | 1508.773 | 10.612 | 1.58913 | 61.25 |
| 49 | −42.530 | 53.300 | | |
| 50(ST) | infinity | 13.100 | | |
| 51 | 234.415 | 5.693 | 1.43700 | 95.10 |
| 52 | −45.001 | 2.049 | | |
| 53 | −42.064 | 1.700 | 1.80610 | 33.27 |
| 54 | 58.563 | 1.078 | | |
| 55 | 42.918 | 8.945 | 1.43700 | 95.10 |
| 56 | −38.922 | 2.849 | | |
| 57 | 83.030 | 5.650 | 1.59282 | 68.62 |
| 58 | −185.037 | 10.742 | | |
| 59 | −26.025 | 2.200 | 1.80610 | 40.73 |
| 60 | 1271.718 | 2.931 | | |
| 61 | −343.902 | 13.374 | 1.55032 | 75.50 |
| 62 | −32.154 | 0.300 | | |
| 63 | 4109.328 | 8.508 | 1.80518 | 25.46 |
| 64 | −72.118 | 16.000 | | |
| 65 | infinity | 85.000 | 1.51680 | 64.20 |
| 66 | infinity | 4.000 | | |

-continued

Unit: mm

| 67 | infinity | 3.000 | 1.48749 | 70.44 |
| 68 | infinity | 1.500 | | |
| image(IM2) | infinity | infinity | | |

Aspherical data

| i | K | A4 | A6 | A8 |
|---|---|---|---|---|
| 5 | 1.0976e+001 | 4.2149e−006 | −1.4362e−009 | 8.7441e−013 |

| i | A10 | A12 | A14 | A16 |
|---|---|---|---|---|
| 5 | 8.8780e−017 | 0.0000e+000 | 0.0000e+000 | 0.0000e+000 |

Aspherical data

| i | K | A4 | A6 | A8 |
|---|---|---|---|---|
| 36 | 0.0000e+000 | 1.9713e−005 | −1.0138e−008 | 2.4708e−011 |

| i | A10 | A12 | A14 | A16 |
|---|---|---|---|---|
| 36 | −1.5376e−014 | 1.7008e−017 | 0.0000e+000 | 0.0000e+000 |

Various data

| F1 | −7.967 |
| Fno. | 2.500 |
| ω | 66.358 |
| ymax | 18.200 |
| TL | 630.056 |
| BF | 79.556 |

TABLE 1

| Values corresponding to conditional formula and the like | | Example 1 | Example 2 | Example 3 | Example 4 |
|---|---|---|---|---|---|
| (1) | Ta/Tw | 0.25 | 0.24 | 0.25 | 0.28 |
| (2) | fa/\|fw\| | 8.56 | 5.28 | 2.15 | 4.10 |
| (3) | Tb/Tw | 0.19 | 0.19 | 0.21 | 0.18 |
| (4) | faf/fa | −0.10 | −0.16 | −0.38 | −0.20 |
| Ta | | 136.506 | 132.572 | 142.802 | 154.140 |
| Tb | | 106.824 | 105.519 | 123.243 | 98.010 |
| Tw | | 550.372 | 550.500 | 578.171 | 550.500 |
| fa | | 68.192 | 42.069 | 29.867 | 32.695 |
| fb | | 40.912 | 36.972 | 72.525 | 33.471 |
| fw | | −7.967 | −7.967 | −13.898 | −7.967 |
| faf | | −7.067 | −6.894 | −11.398 | −6.396 |
| far | | 45.164 | 41.627 | 36.546 | 42.676 |
| L1 | | 1622.3 | 1624.8 | 3001.1 | 1646.2 |

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A projection optical system enlarges and projects an image displayed on an image display surface, the projection optical system comprising:
   a first optical system; and
   a second optical system, wherein
   the projection optical system is a monofocal lens or a zoom lens,
   the first optical system and the second optical system are arranged, in order starting with the first optical system, from an enlargement side of the projection optical system,
   the second optical system forms an intermediate image of the image between the first optical system and the second optical system,
   the first optical system enlarges and projects the intermediate image,
   the first optical system comprises:
      a first-A optical system and a first-B optical system in order from the enlargement side; and
      a reflecting optical element that bends a light path between the first-A optical system and the first-B optical system,
   the first-A optical system comprises:
      a negative front group comprising no positive lens; and
      a positive rear group comprising no negative lens,
   the light path is bent only once by 90 degrees, and
   the projection optical system satisfies formula (1):

$$0.2 < Ta/Tw < 0.3 \tag{1}$$

where Ta is an on-axis distance from a lens surface closest to the enlargement side to a lens surface closest to a reduction side in the first-A optical system, and Tw is an on-axis distance from a lens surface closest to the enlargement side to a lens surface closest to the reduction side in the projection optical system.

2. The projection optical system according to claim 1, wherein the negative front group comprises a plurality of negative lenses and the positive rear group comprises a plurality of positive lenses.

3. The projection optical system according to claim 1, wherein
   the first-A optical system comprises a first focusing part that moves during focusing, and
   the first-B optical system or the second optical system comprises a second focusing part that moves during focusing.

4. The projection optical system according to claim 1, wherein the first optical system and the second optical system are on a same optical axis.

5. The projection optical system according to claim 1, wherein the second optical system and an entirety of the projection optical system are telecentric on the reduction side.

6. The projection optical system according to claim 1, wherein the projection optical system is a zoom lens that zooms by moving a lens group comprising a portion of the second optical system along an optical axis.

7. The projection optical system according to claim 1, wherein the reflecting optical element is a plane mirror.

8. The projection optical system according to claim 1, wherein
   the reflecting optical element is a triangular prism, and
   an oblique side of the triangular prism is a reflecting surface that bends the light path.

9. A projection apparatus comprising:
   an image display element comprising an image display surface; and
   a projection optical system that enlarges and projects an image displayed on the image display surface, wherein
   the projection optical system comprises a first optical system and a second optical system in order from an enlargement side of the projection optical system,
   the second optical system forms an intermediate image of the image between the first optical system and the second optical system,
   the first optical system enlarges and projects the intermediate image, the first optical system comprises:
  a first-A optical system and a first-B optical system in order from the enlargement side; and
  a reflecting optical element that bends a light path between the first-A optical system and the first-B optical system,
the first-A optical system comprises:
  a negative front group comprising no positive lens; and
  a positive rear group comprising no negative lens,
the light path is bent only once by 90 degrees, and
the projection optical system satisfies formula (1):

$$0.2 < Ta/Tw < 0.3 \qquad (1)$$

where Ta is an on-axis distance from a lens surface closest to the enlargement side to a lens surface closest to a reduction side in the first-A optical system, and Tw is an on-axis distance from a lens surface closest to the enlargement side to a lens surface closest to the reduction side in the projection optical system.

10. The projection apparatus according to claim 9, wherein a lens closest to a screen side in the projection optical system is disposed closest to the screen side in an entirety of the projection apparatus.

11. The projection apparatus according to claim 9, wherein the reflecting optical element is a plane mirror.

12. The projection apparatus according to claim 9, wherein
  the reflecting optical element is a triangular prism, and
  an oblique side of the triangular prism is a reflecting surface that bends the light path.

13. The projection apparatus according to claim 9, wherein the negative front group comprises a plurality of negative lenses and the positive rear group comprises a plurality of positive lenses.

* * * * *